US009005783B2

(12) United States Patent  (10) Patent No.: US 9,005,783 B2
Ahn  (45) Date of Patent: Apr. 14, 2015

(54) POUCH-TYPE RECHARGEABLE BATTERY WITH POLARIZED BODY AND COVER

(75) Inventor: Changbum Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 744 days.

(21) Appl. No.: 12/962,395

(22) Filed: Dec. 7, 2010

(65) Prior Publication Data

US 2011/0135971 A1   Jun. 9, 2011

(30) Foreign Application Priority Data

Dec. 8, 2009  (KR) ........................ 10-2009-0121017

(51) Int. Cl.
*H01M 2/30*    (2006.01)
*H01M 10/42*   (2006.01)
*H01M 10/04*   (2006.01)
*H01M 2/02*    (2006.01)
*H01M 10/0585* (2010.01)

(52) U.S. Cl.
CPC .............. *H01M 10/04* (2013.01); *H01M 2/021* (2013.01); *H01M 10/0585* (2013.01)

(58) Field of Classification Search
CPC .. H01M 2/021; H01M 10/0585; H01M 10/04
USPC ....... 429/7, 121, 162, 163, 175, 176
See application file for complete search history.

(56) References Cited

U.S. PATENT DOCUMENTS 6,468,692 B1   10/2002  Nemoto et al.
7,033,697 B2    4/2006  Park et al.
7,261,972 B2    8/2007  Inada et al.
7,348,101 B2    3/2008  Gozdz et al.
7,470,486 B2   12/2008  Lee et al.
(Continued)

FOREIGN PATENT DOCUMENTS

JP    2005123158 A   5/2005
KR   1020040026544 A   3/2004
(Continued)

OTHER PUBLICATIONS

Korean Notice of Allowance issued May 19, 2012 in connection with Korean Patent Application Serial No. 10-2009-0121017 and Request for Entry of the Accompanying Office Action attached herewith.
(Continued)

*Primary Examiner* — Nicholas P D'Aniello
*Assistant Examiner* — Michael Dignan
(74) *Attorney, Agent, or Firm* — Robert E. Bushnell, Esq.

(57) ABSTRACT

A secondary battery comprises an electrode assembly including a first electrode, a second electrode, a separator for insulating the first electrode and the second electrode from each other, a first electrode tab extending from the first electrode, a second electrode tab extending from the second electrode, and a pouch including a body and a cover. The body includes a receiving part for accommodating the electrode assembly, and a body sealing part extending from the receiving part. The cover includes a covering part corresponding to the receiving part of the body, and a cover sealing part corresponding to the body sealing part. At least two insulation layers and a conductive are provided at the body and the cover, respectively. The first electrode tab and the second electrode tab are electrically connected to the conductive layers of the body and the cover, respectively.

30 Claims, 17 Drawing Sheets

(56) References Cited

U.S. PATENT DOCUMENTS

| | | |
|---|---|---|
| 7,642,015 B2 | 1/2010 | Inada et al. |
| 7,687,195 B2 | 3/2010 | Abe et al. |
| 7,700,228 B2 | 4/2010 | Takeshita et al. |
| 2003/0099880 A1 | 5/2003 | Park et al. |
| 2003/0180609 A1* | 9/2003 | Yamashita et al. ............ 429/185 |
| 2004/0033416 A1* | 2/2004 | Kim et al. ..................... 429/175 |
| 2005/0014036 A1* | 1/2005 | Kim ................................. 429/7 |
| 2005/0084749 A1 | 4/2005 | Hwang et al. |
| 2005/0118499 A1 | 6/2005 | Kim |
| 2005/0123829 A1 | 6/2005 | Fukui et al. |
| 2005/0233219 A1 | 10/2005 | Gozdz et al. |
| 2005/0233220 A1 | 10/2005 | Gozdz et al. |
| 2006/0115722 A1 | 6/2006 | Kim |
| 2006/0127774 A1 | 6/2006 | Kim et al. |
| 2006/0154145 A1 | 7/2006 | Lee |
| 2007/0202395 A1* | 8/2007 | Snyder et al. ................ 429/160 |
| 2007/0231686 A1 | 10/2007 | Kim |
| 2008/0102354 A1 | 5/2008 | Lee |
| 2008/0292956 A1 | 11/2008 | Hong et al. |
| 2008/0292962 A1 | 11/2008 | Jung |
| 2009/0111011 A1 | 4/2009 | Kim et al. |
| 2009/0117459 A1 | 5/2009 | Hyung et al. |
| 2009/0130554 A1 | 5/2009 | Jang et al. |
| 2009/0162749 A1 | 6/2009 | Lee |
| 2009/0176156 A1* | 7/2009 | Lee ................................ 429/178 |
| 2009/0208835 A1 | 8/2009 | Horiuchi et al. |
| 2009/0305123 A1 | 12/2009 | Wada et al. |
| 2009/0317714 A1 | 12/2009 | Maeng et al. |
| 2010/0035132 A1 | 2/2010 | Park |
| 2010/0047685 A1 | 2/2010 | Lee et al. |
| 2010/0075205 A1 | 3/2010 | Kwag et al. |
| 2010/0124674 A1 | 5/2010 | Kwag |
| 2010/0136422 A1 | 6/2010 | Koh et al. |
| 2010/0143786 A1 | 6/2010 | Kim |
| 2010/0143787 A1 | 6/2010 | Jung et al. |
| 2010/0143789 A1 | 6/2010 | Kim |

FOREIGN PATENT DOCUMENTS

| | | |
|---|---|---|
| KR | 10-2005-0037688 | 4/2005 |
| KR | 1020060028182 A | 3/2006 |
| KR | 10-2008-0102606 | 11/2008 |
| KR | 10-2009-0064757 | 6/2009 |

OTHER PUBLICATIONS

Korean Office Action issued by KIPO, dated Apr. 27, 2011, corresponding to Korean Patent Application No. 10-2009-0121017, together with Request for Entry.

* cited by examiner

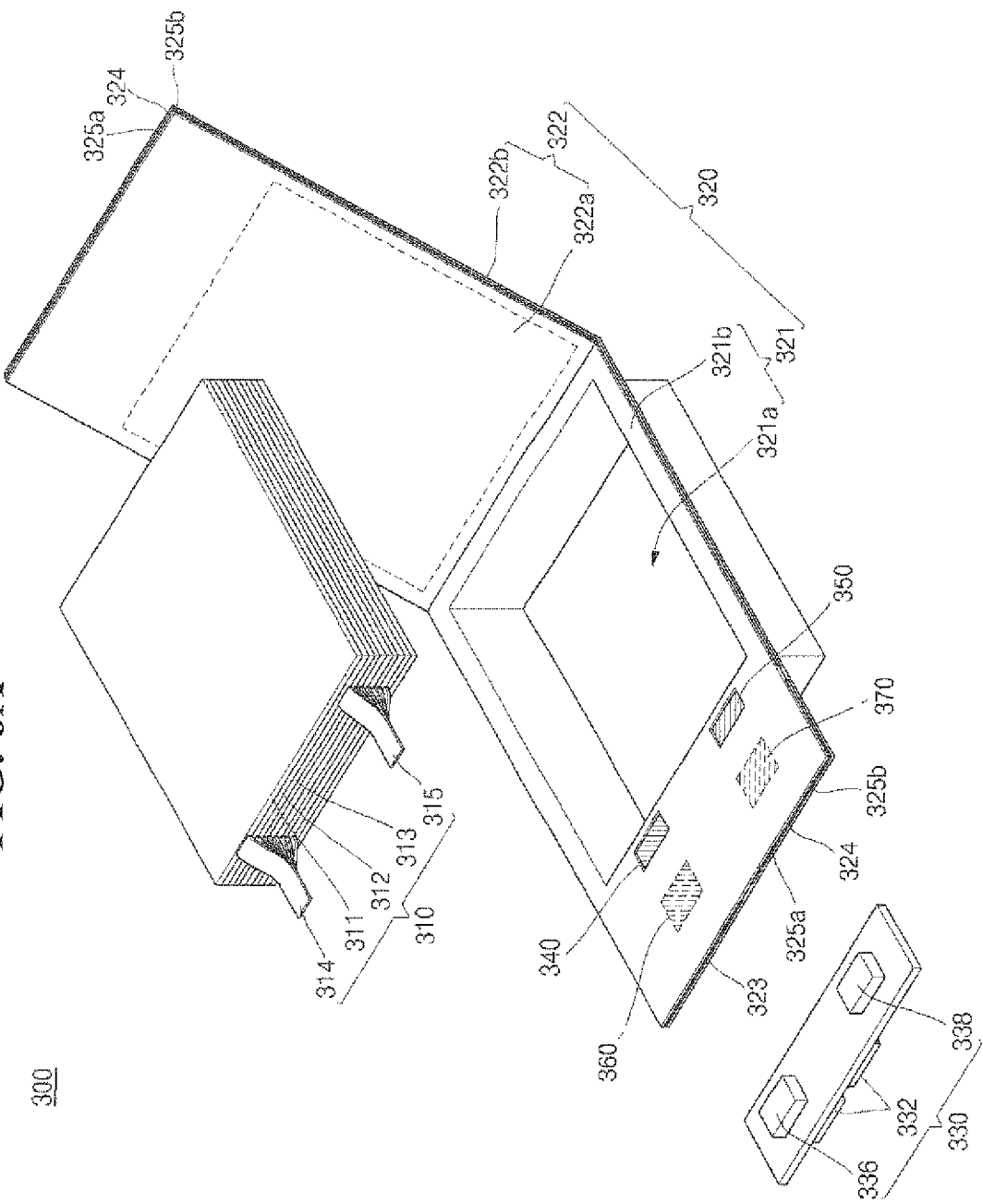

POUCH-TYPE RECHARGEABLE BATTERY WITH POLARIZED BODY AND COVER

CLAIM OF PRIORITY

This application makes reference to, incorporates into this specification the entire contents of, and claims all benefits accruing under 35 U.S.C. §119 from an application earlier filed in the Korean Intellectual Property Office filed on the 8th of Dec. 2009 and there duly assigned Serial No. 10-2009-0121017.

BACKGROUND OF THE INVENTION

1. Field of the Invention

The present invention relates to a secondary battery without electrode tabs extending outwardly from a pouch which accommodates an electrode assembly, the secondary battery having a high-strength pouch.

2. Description of the Related Art

Generally, a secondary battery comprises an electrode assembly including a first electrode, a second electrode and a separator interposed between those two electrodes.

The electrode assembly includes a first electrode tab extending from the first electrode and a second electrode tab extending from the second electrode.

The secondary battery includes a pouch which accommodates the electrode assembly.

In the secondary battery, the first electrode tab and the second electrode tab extend outside the pouch extending from the electrode assembly.

The first electrode tab and the second electrode tab extending outside the pouch are connected to external equipment.

SUMMARY OF THE INVENTION

It is, therefore, an aspect of the present invention to provide a secondary battery without electrode tabs extending outwardly from a pouch which accommodates an electrode assembly.

It is another aspect of the present invention to provide a secondary battery having a high-strength pouch.

In order to achieve the above and other aspects of the present invention, one embodiment of the present invention provides a secondary battery comprising an electrode assembly including a first electrode, a second electrode, a separator interposed between the first electrode and the second electrode and insulating the first electrode and the second electrode from each other, a first electrode tab extending from one side of the first electrode, a second electrode tab extending from one side of the second electrode, and a pouch including a body and a cover, wherein the body of the pouch includes a receiving part for accommodating the electrode assembly and a body sealing part extending from the receiving part, the cover of the pouch includes a covering part corresponding to the receiving part of the body and a cover sealing part corresponding to the body sealing part. At least two insulation layers and a conductive layer interposed between the at least two insulation layers are provided at the body and the cover of the pouch, respectively, and the first electrode tab and the second electrode tab are electrically connected to the conductive layers of the body and the cover of the pouch, respectively.

The first electrode tab and the second electrode tab extending from the electrode assembly may not extend outside the pouch.

The conductive layer may be made of aluminum (Al) or copper (Cu).

The conductive layer of the body may include first conductive layers formed at the receiving part and the body sealing part extending from the receiving part, and the conductive layer of the cover may include second conductive layers formed at the covering part and the cover sealing part extending from the covering part.

The body may include a first tab contact portion exposing the first conductive layer formed at one surface thereof, the cover may include a second tab contact portion exposing the second conductive layer formed at its one surface facing the one surface of the body, the first electrode tab may be electrically connected to the first conductive layer through the first tab contact portion, and the second electrode tab may be electrically connected to the second conductive layer through the second tab contact portion.

The first tab contact portion may be formed at one surface of the receiving part or at one surface of the body sealing part, and the second tab contact portion may be formed at one surface of the covering part or at one surface of the cover sealing part.

The body sealing part may include a via hole formed at the other surface thereof and passing through the first external contact portion exposing the first conductive layer and the body sealing part, and the cover sealing part may include a second external contact portion exposing the second conductive layer formed at one surface, the second external contact portion corresponding to the via hole.

The secondary battery may further include a protective circuit module. In this regard, the protective circuit module may be electrically connected to the first external contact portion and the second external contact portion.

The protective circuit module may be formed at the other surface of the body sealing part.

The conductive layer of the body may include first conductive layers formed at the receiving part and the body sealing part extending from the receiving part, the conductive layer of the cover may include second conductive layers formed at the covering part and the cover sealing part extending from the covering part, the body sealing part may have a predetermined area without the first conductive layer, and the cover sealing part may have a predetermined area without the second conductive layer, the predetermined area of the body sealing part overlapping in a planar manner the predetermined area of the cover sealing part.

The body may include a first tab contact portion exposing the first conductive layer formed at one surface thereof, the cover may include a second tab contact portion exposing the second conductive layer formed at one surface facing the one surface of the body, the first electrode tab may be electrically connected to the first conductive layer through the first tab contact portion, and the second electrode tab may be electrically connected to the second conductive layer through the second tab contact portion.

The first tab contact portion may be formed at one surface of the receiving part or at one surface of the body sealing part, and the second tab contact portion may be formed at one surface of the covering part or at one surface of the cover sealing part.

The body sealing part may include a via hole exposing the first conductive layer at the other surface thereof, the via hole passing through the first external contact portion and the body sealing part, and the cover sealing part may include a second external contact portion exposing the second conductive layer at one surface thereof, the second external contact portion corresponding to the via hole.

The secondary battery may further include a protective circuit module. In this regard, the protective circuit module may be electrically connected to the first external contact portion and the second external contact portion.

The protective circuit module may include a first contact terminal contacting the first external contact portion and a second contact terminal contacting the second external contact portion, wherein the first contact terminal is formed so as to have a height corresponding to a depth of the first external contact portion, and the second contact terminal is formed so as to have a height corresponding to the depth of the via hole and the second external contact portion.

The protective circuit module may be provided at one surface of the body sealing part.

The conductive layer of the body may include first conductive layers formed at the receiving part and the body sealing part extending from the receiving part, and the conductive layer of the cover may include second conductive layers electrically insulated from the first conductive layer and formed at a region other than the predetermined area of the cover sealing part.

The body sealing part may include a first tab contact portion exposing the first conductive layer and a second tab contact portion exposing the second conductive layer, the first and second tab contact portions formed at one surface of the body sealing part, the first electrode tab may be electrically connected to the first conductive layer through the first tab contact portion, and the second electrode tab may be electrically connected to the second conductive layer through the second tab contact portion.

The body sealing part may include a first external contact portion exposing the first conductive layer and a second external contact portion exposing the second conductive layer, the first and second external contact portions formed at the other surface of the body sealing part.

The secondary battery may further include a protective circuit module. In this case, the protective circuit module may be electrically connected to the first external contact portion and the second external contact portion.

The protective circuit module may include a first contact terminal contacting the first external contact portion and a second contact terminal contacting the second external contact portion, the first contact terminal may be formed so as to have a height corresponding to a depth of the first external contact portion, and the second contact terminal may be formed so as to have a height corresponding to the depth of the via hole and the second external contact portion.

The protective circuit module may be provided at the other surface of the body sealing part.

The conductive layer of the body may include first conductive layers formed at the receiving part and the body sealing part extending from the receiving part, the conductive layer of the cover may include second conductive layers formed at the covering part and the cover sealing part extending from the covering part, the body may include a first tab contact portion exposing the first conductive layer formed at one surface thereof and a first external contact portion exposing the first conductive layer at the other surface thereof, the cover may include a second tab contact portion exposing the second conductive layer formed at one surface facing the one surface of the body and a second external contact portion exposing the second conductive layer at the other surface thereof, the first electrode tab may be electrically connected to the first conductive layer through the first tab contact portion, and the second electrode tab may be electrically connected to the second conductive layer through the second tab contact portion.

The first or second conductive layer may be made of aluminum (Al) or copper (Cu).

The secondary battery may further include a protective circuit module. In this case, the protective circuit module may be electrically connected to the first external contact portion and the second external contact portion.

The protective circuit module may include a first contact terminal contacting the first external contact portion and a second contact terminal contacting the second external contact portion, wherein the second contact terminal is bent at least twice, one side end thereof being connected to the protective circuit module and the other side end thereof being connected to the second external contact portion.

The protective circuit module may be provided at the other surface of the body sealing part.

The conductive layer of the lower body may include first conductive layers formed at the first receiving part and the lower body sealing part extending from the first receiving part, The conductive layer of the upper body may include second conductive layers formed at the second receiving part and the upper body sealing part extending from the second receiving part, The lower body sealing part may have a predetermined area without the first conductive layer, and the upper body sealing part may have a predetermined area without the second conductive layer, the predetermined area of the lower body sealing part overlapping in a planar manner the predetermined area of the upper body cover sealing part, The lower body sealing part may include first external contact portions exposing the first conductive layers to one and the other surfaces, and a first conductive layer via hole through which the predetermined areas of the first conductive layers exposed by the first external contact portion are passed.

The upper body sealing part may include second external contact portions exposing the second conductive layers to one and the other surfaces, and a second conductive layer via hole through which the predetermined areas of the second conductive layers exposed by the second external contact portion are passed.

The secondary battery may further include a first connection member electrically connecting the first conductive layers of the plurality of unit cells, a second connection member electrically connecting the second conductive layer of the plurality of unit cells, and a plurality of fastening members fastening the first connection member or the second connection member to the plurality of unit cells, respectively, wherein the first connection member and the second connection member are electrically connected to the protective circuit module.

The electrically connection of the first conductive layers and the second conductive layers to the protective circuit module may be established using the first connection member and the second connection member, respectively, electrically connected to the first conductive layers and the second conductive layers, respectively, exposed by the first external contact portions provided at the respective unit cells.

Electrical connections between the first connection member and each of the first conductive layers and electrical connections between the second connection member and each of the second conductive layers may be established using respective clip-type connecting parts, and each of the clip-type connecting parts may have a first terminal, a second terminal and a third terminal, and may be formed in the shape of a clip bent between the first terminal and the second terminal and between the second terminal and the third terminal so as to connect the lower body and the upper body at once and so as to be combined with each of the plurality of unit cells.

The insulation layers may comprise four layers which are made of CPP (cast polypropylene), nylon or PET, and the conductive layer may be disposed between the CPP layer and the nylon layer.

Additional aspects and/or advantages of the invention will be set forth, in part, in the description which follows and, in part, will be obvious from the description, or may be learned by practice of the invention.

In detail, at least one of the above and other features and advantages may be realized by providing a secondary battery without electrode tabs extending outwardly from a pouch which accommodates an electrode assembly.

At least one of the above and other features and advantages may also be realized by providing a secondary battery having a high-strength pouch.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6A is a perspective view of a secondary battery according to a third preferred embodiment of the present invention;

DETAILED DESCRIPTION OF THE INVENTION

Exemplary embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
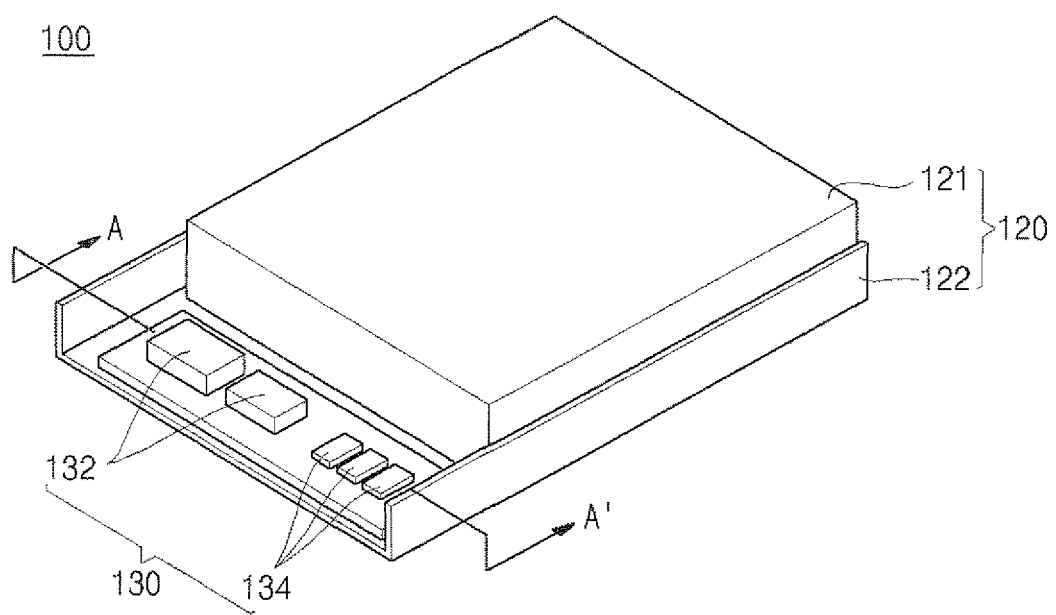
FIG. 1 is a perspective view of a secondary battery according to a first preferred embodiment of the present invention.
Figure 2:
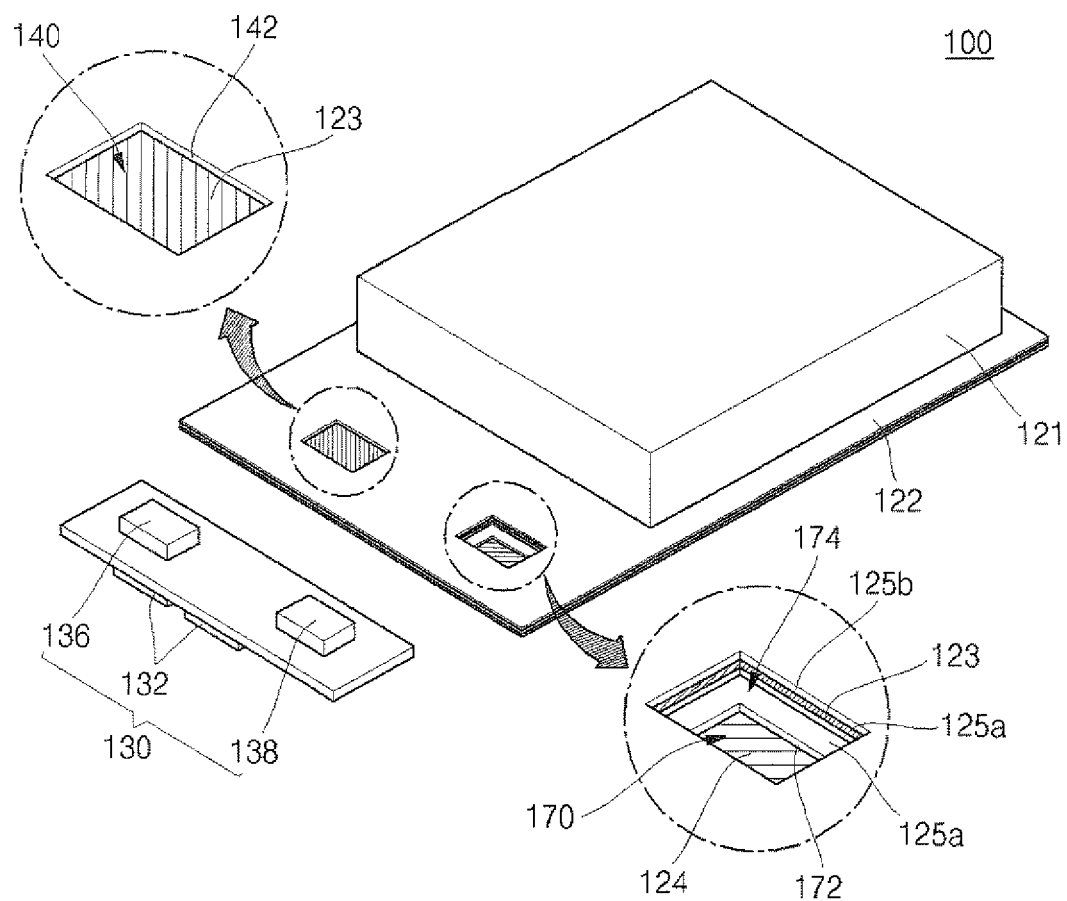
FIGS. 2, 3A and 3B are exploded perspective views of the secondary battery illustrated in FIG. 1.
Figure 3A:
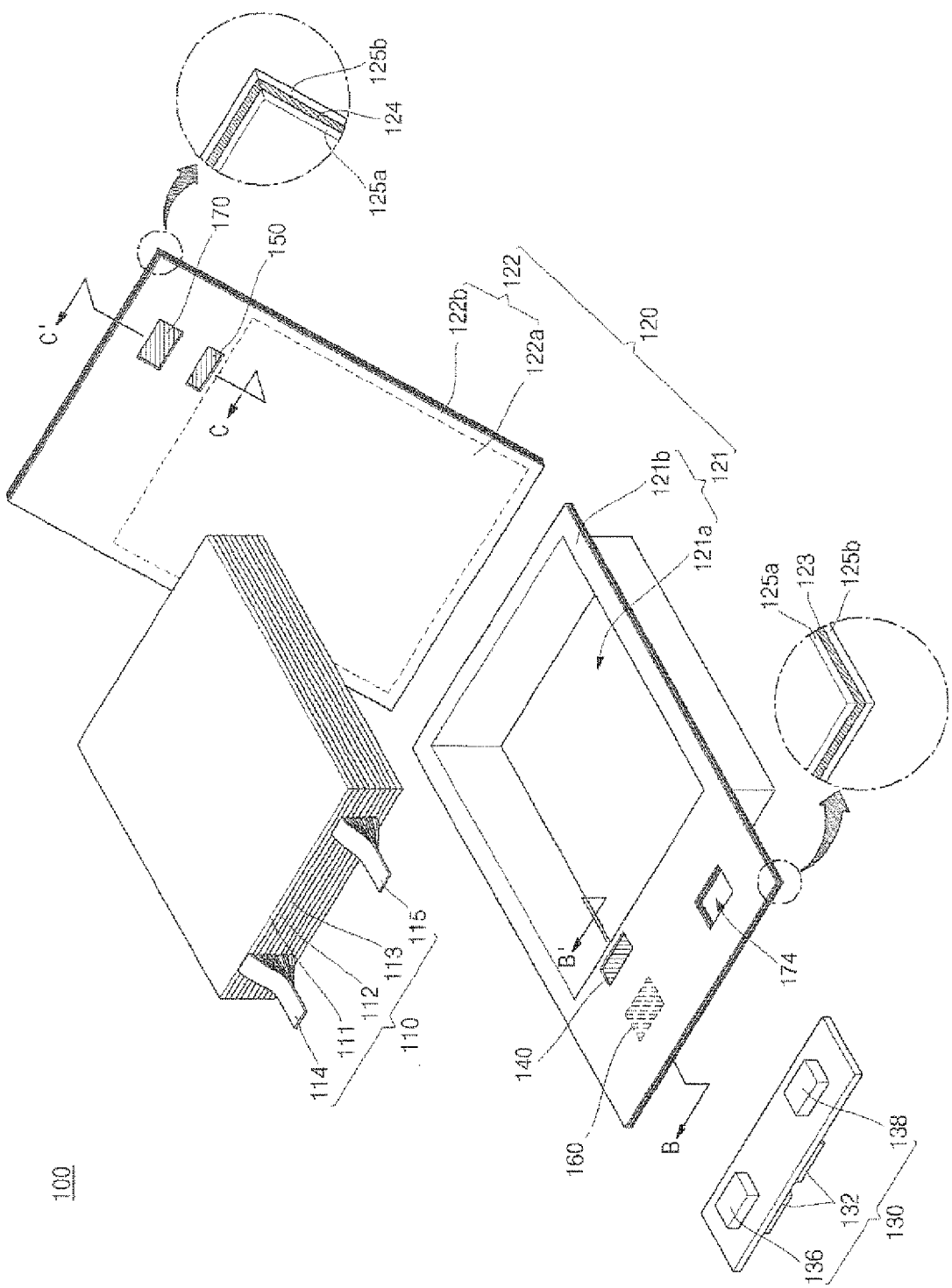
Figure 3B:
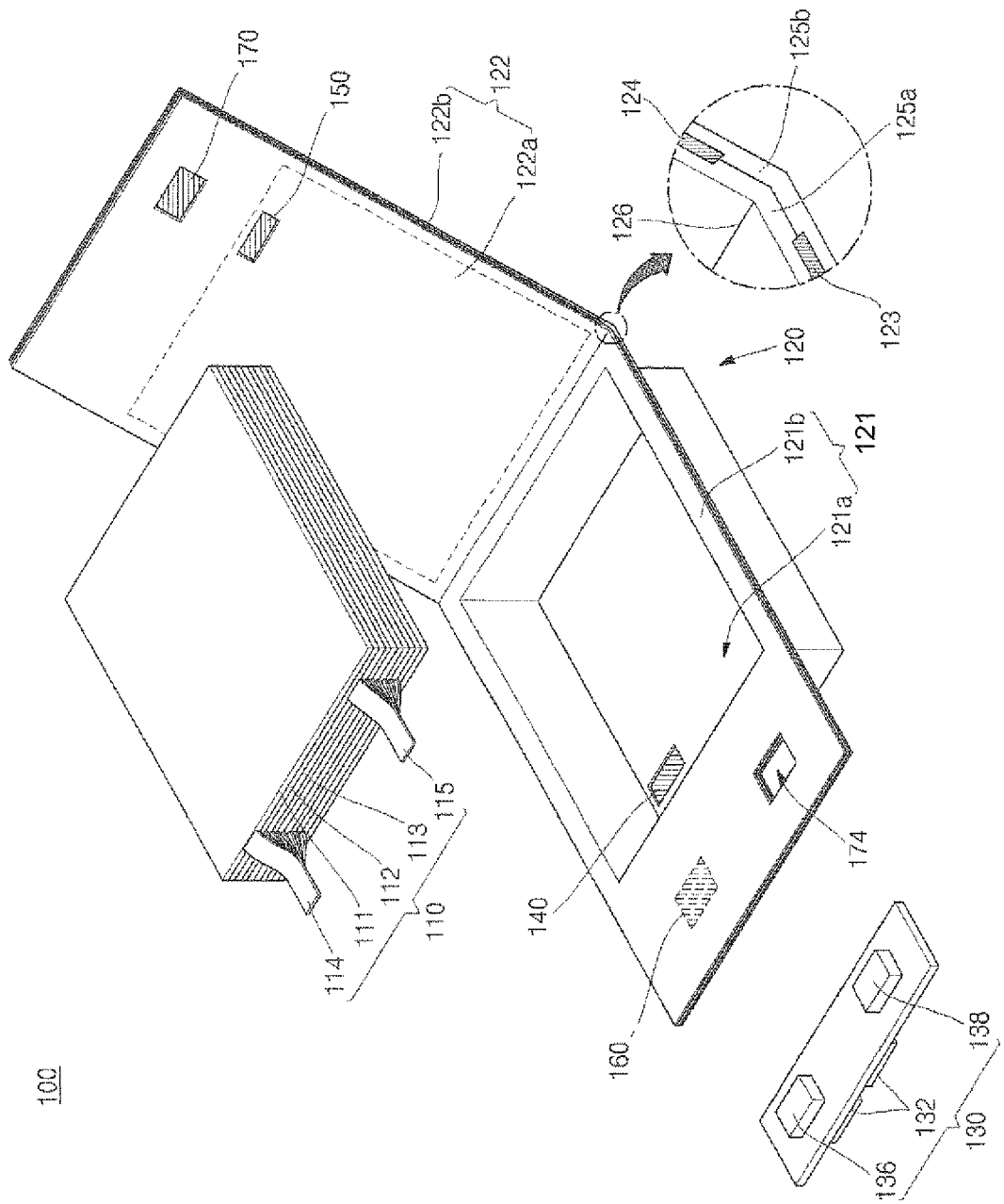
Figure 4A:
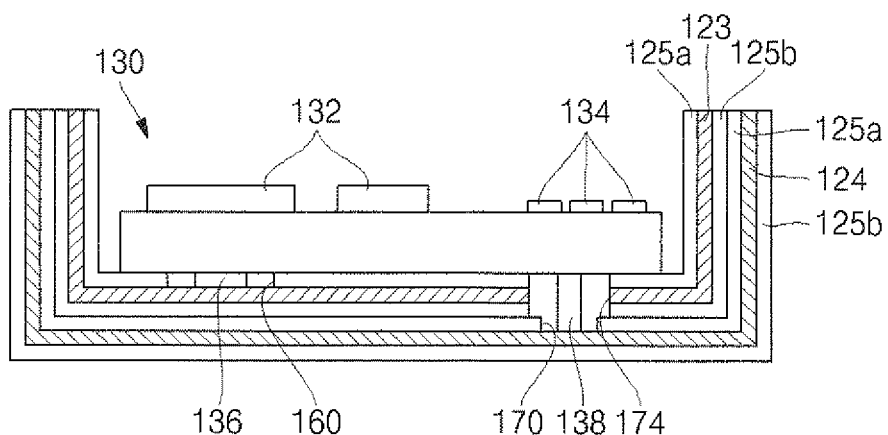
FIG. 4A is a cross-sectional view taken along line A-A' of FIG. 3A.
Figure 4B:
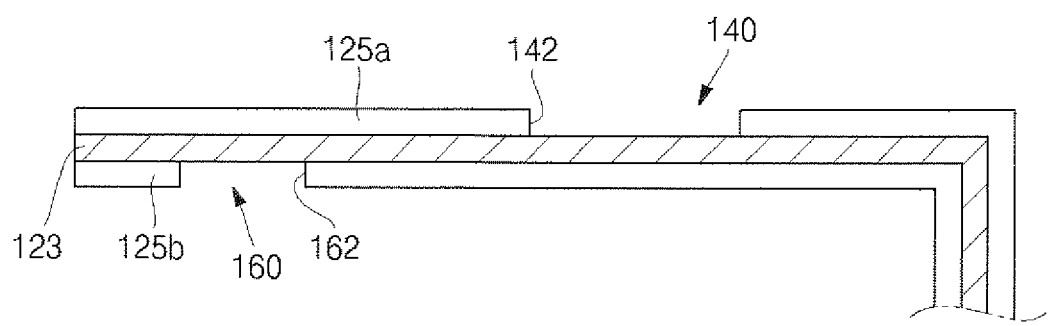
FIG. 4B is a cross-sectional view taken along line B-B' of FIG. 3A.
Figure 4C:
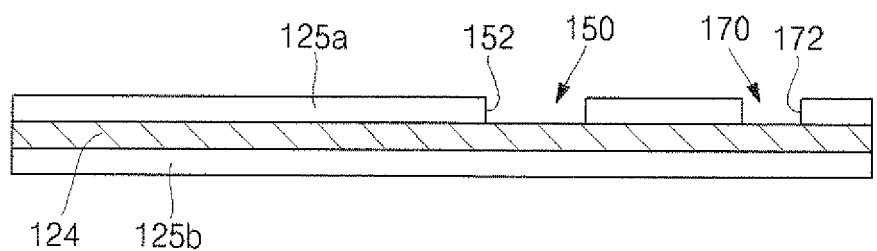
FIG. 4C is a cross-sectional view taken along line C-C' of FIG. 3A.

FIG. 1 is a perspective view of a secondary battery according to a first preferred embodiment of the present invention; FIGS. 2, 3A and 3B are exploded perspective views of the secondary battery illustrated in FIG. 1; FIG. 4A is a cross-sectional view taken along line A-A' of FIG. 3A; FIG. 4B is a cross-sectional view taken along line B-B' of FIG. 3A; and FIG. 4C is a cross-sectional view taken along line C-C' of FIG. 3A.

Referring to FIGS. 1, 2, 3A, 3B and 4A thru 4C, the secondary battery 100 includes an electrode assembly 110, a pouch 120, and a protective circuit module 130.

The electrode assembly 110 (FIG. 3A) includes a first electrode 111, a second electrode 112, and a separator 113 interposed between the first electrode 111 and the second electrode 112, and insulating the first electrode 111 and the second electrode 112 from each other.

In addition, the electrode assembly 110 includes a first electrode tab 114 extending from one side of the first electrode 110, and a second electrode tab 115 extending from one side of the second electrode 112.

The electrode assembly 110 may be a stacked electrode assembly in which the first electrode 111, the separator 113 and the second electrode 112 are repeatedly stacked one on another. Alternatively, the electrode assembly 110 may be a wound electrode assembly in which the first electrode 111, the separator 113 and the second electrode 112 are wound in a jelly-roll configuration.

The first electrode 111 is a positive electrode, and the second electrode 112 is a negative electrode. Conversely, the first electrode 111 may be a negative electrode, and the second electrode 112 may be a positive electrode.

The pouch 120 includes a body 121 and a cover 122.

The pouch 120 may have a thickness of approximately 150 to 200 μm.

The body 121 includes a receiving part 121a for accommodating the electrode assembly 110, and a body sealing part 121b extending from an entrance of the receiving part 121a.

The cover 122 includes a covering part 122a corresponding to the receiving part 121a of the body 121, and a cover sealing part 122b corresponding to the body sealing part 121b.

The body 121 and the cover 122 of the pouch 120 include at least two insulation layers and a conductive layer interposed between the at least two insulation layers, respectively.

The conductive layers provided in the body 121 and the cover 122 are electrically connected to the first electrode tab 114 and the second electrode tab 115 of the electrode assembly 110, respectively.

Therefore, the conductive layer interposed between the insulation layers of the body 121, which is to be referred to as a first conductive layer 123, is made of aluminum (Al) or copper (Cu), and the conductive layer interposed between the insulation layers of the cover 122, which is to be referred to as a second conductive layer 124, is also made of aluminum (Al) or copper (Cu).

In this regard, when the first conductive layer 123 is connected to the first electrode tab 114 and the first electrode tab 114 extends from the first electrode 111 which is a positive electrode, the first conductive layer 123 is made of aluminum (Al). When the second conductive layer 124 is connected to the second electrode tab 115 and the second electrode tab 115 extends from the second electrode 112 which is a negative electrode, the second conductive layer 124 is made of copper (Cu).

The first conductive layer 123 includes the receiving part 121a for the body 121 and the body sealing part 121b extending from the receiving part 121a. The second conductive layer 124 includes the covering part 122a and the cover sealing part 122b extending from the covering part 122a.

In this case, since the body 121 and the cover 122 of the pouch 120 are separated from each other, as shown in FIG. 3A, the first conductive layer 123 and the second conductive layer 124 are insulated from each other.

In addition, as shown in FIG. 3B, the body 121 and the cover 122 of the pouch 120 are configured such that the cover 122 extends from one side of the body sealing part 121b of the body 121, so that the body 121 and the cover 122 of the pouch 120 are connected to each other. In this regard, since the first conductive layer 123 and the second conductive layer 124 are separated from each other at an interconnected part of the body 121 and the cover 122, that is, a bent portion 126 of the body 121 and the cover 122, they are insulated from each other.

While the current embodiment illustrates that two insulation layers, that is, a first insulation layer 125a and a second insulation layer 125b, which insulate the first conductive layer 123 and the second conductive layer 124 from each other, are disposed between the first conductive layer 123 and the second conductive layer 124, aspects of the present invention are not limited thereto.

That is to say, each insulation layer of the body 121 and the cover 122 may comprise three or more layers.

The first insulation layer 125a and the second insulation layer 125b may be made of insulating materials, such as CPP (cast polypropylene), nylon, PET, or other polymeric material.

The first conductive layer 123 and the second conductive layer 124 are electrically connected to the first electrode tab 114 and the second electrode tab 115, respectively, of the electrode assembly 110.

As shown in FIGS. 3A and 3B, the first electrode tab 114 is electrically connected to the first conductive layer 123 through a first tab contact portion 140 formed on one surface of the body 121, that is, at a predetermined position in the body sealing part 121b or a predetermined position in the receiving part 121a. In the current embodiment, the invention is described by way of example with regard to the first tab contact portion 140 formed at the body sealing part 121b.

Here, the first tab contact portion 140 exposes the first conductive layer 123 by a first open area 142 having a predetermined open area of the first insulation layer 125a formed at the body 121.

As shown in FIGS. 3A and 3B, the second electrode tab 115 is electrically connected to the second conductive layer 124 through a second tab contact portion 150 formed on one surface of the cover 122, facing the one surface of the body 121, that is, at a predetermined position in the cover sealing part 122b or a predetermined position in the covering part 122a.

In the current embodiment, the present invention is described by way of example with regard to the second tab contact portion 150 formed on the cover sealing part 122b.

Here, the second tab contact portion 150 exposes the second conductive layer 124 by a second open area 152 (FIG. 4C) having a predetermined open area of the first insulation layer 125a formed on the cover 122.

The first electrode tab 114 and the first conductive layer 123 of the first tab contact portion 140 are welded to each other by, for example, resistance welding, and the second electrode tab 115 and the second conductive layer 124 of the second tab contact portion 150 are welded to each other by, for example, resistance welding.

The first conductive layer 123 and the second conductive layer 124 are electrically connected to the protective circuit module 130.

The protective circuit module 130 is electrically connected to the first conductive layer 123 exposed by a first external contact portion 160 (FIGS. 4A and 4B) formed on the other surface of the body 121, preferably on the other surface of the body sealing part 121b.

In addition, the protective circuit module 130 is electrically connected to the second conductive layer 124 exposed by a second external contact portion 170 (FIGS. 4A and 4C) formed on one surface of the cover 122, preferably on one surface of the cover sealing part 122b.

The first external contact portion 160 exposes the first conductive layer 123 through a third open area 162 (FIG. 4B) having a predetermined open area of the second insulation layer 125b of the body 121.

The second external contact portion 170 exposes the second conductive layer 124 through a fourth open area 172 (FIG. 4C) having a predetermined open area of the first insulation layer 125a of the cover 122.

The body sealing part 121b includes a via hole 174 (FIG. 4A) at a region corresponding to the second external contact portion 170, the via hole 174 passing through the first insulation layer 125a, the first conductive layer 123 and the second insulation layer 125b.

The via hole 174 corresponds to the second external contact portion 170.

The via hole 174 opens the second conductive layer 124 exposed by the second external contact portion 170 to the other surface of the body sealing part 121b when the body 121 and the cover 122 are sealed to each other.

Here, the diameter or width of the via hole 174 is preferably larger than that of the second external contact portion 170. This is for the purpose of insulating a lateral surface of the first conductive layer 123 exposed due to formation of the via hole 174 from the second conductive layer 124 when the second conductive layer 124 is electrically connected to the protective circuit module 130.

The protective circuit module 130 is formed at the other surface of the body sealing part 121b.

The protective circuit module 130 includes control devices 132 (FIGS. 3A and 3B), such as an integrated circuit (IC) element for controlling the secondary battery 100, and external terminals 134 connected to external equipment.

The protective circuit module 130 (FIG. 4A) also includes a first contact terminal 136 contacting the first conductive layer 123 exposed by the first external contact portion 160, and a second contact terminal 138 contacting the second conductive layer 124 exposed by the second external contact portion 170.

The first contact terminal 136 has a height corresponding to a depth of the first external contact portion 160. That is to say, the height of the first contact terminal 136 is the same as or greater than a thickness of the first insulation layer 125a of the body 121.

The second contact terminal 138 is formed to have a height corresponding to the depth of the via hole 174 and the second external contact portion 170. That is to say, the height of the second contact terminal 138 is the same as or greater than the sum of each of thicknesses the first insulation layer 125a, the first conductive layer 123 and the second insulation layer 125b of the body 121 and the thickness of the first insulation layer 125a of the cover 122.

Therefore, the secondary battery 100 according to the first embodiment of the present invention is constructed such that it comprises the pouch 120 including the body 121 and the cover 122, each comprising the first conductive layer 123 and the second conductive layer 124, the electrode assembly 110 including the first electrode tab 114 and the second electrode tab 115, and the protective circuit module 130 including the first contact terminal 136 and the second contact terminal 138.

In this regard, the first electrode tab 114 is electrically connected to the first conductive layer 123, the second electrode tab 115 is electrically connected to the second conductive layer 124, and the first conductive layer 123 and the second conductive layer 124 are electrically connected to the protective circuit module 130 through the first contact terminal 136 and the second contact terminal 138.

In the secondary battery 100 according to the first embodiment of the present invention, the electrode assembly 110 can be electrically connected to the protective circuit module 130 without a separate component, e.g., an external tab externally extending from the pouch 120. That is to say, the first electrode tab 114 and the second electrode tab 115, which extend from the electrode assembly 110, are provided within the receiving part 121a of the pouch 120 without extending outside the pouch 120. Alternatively, the first electrode tab 114 and the second electrode tab 115 extend only up to the body sealing part 121b and the cover sealing part 122b of the pouch 120 while they do not extend outside the pouch 120.

In addition, the secondary battery 100 according to the first embodiment of the present invention is resistant against external shocks because the pouch 120, including the first conductive layer 123 and the second conductive layer 124, has a high strength.

Figure 5A:
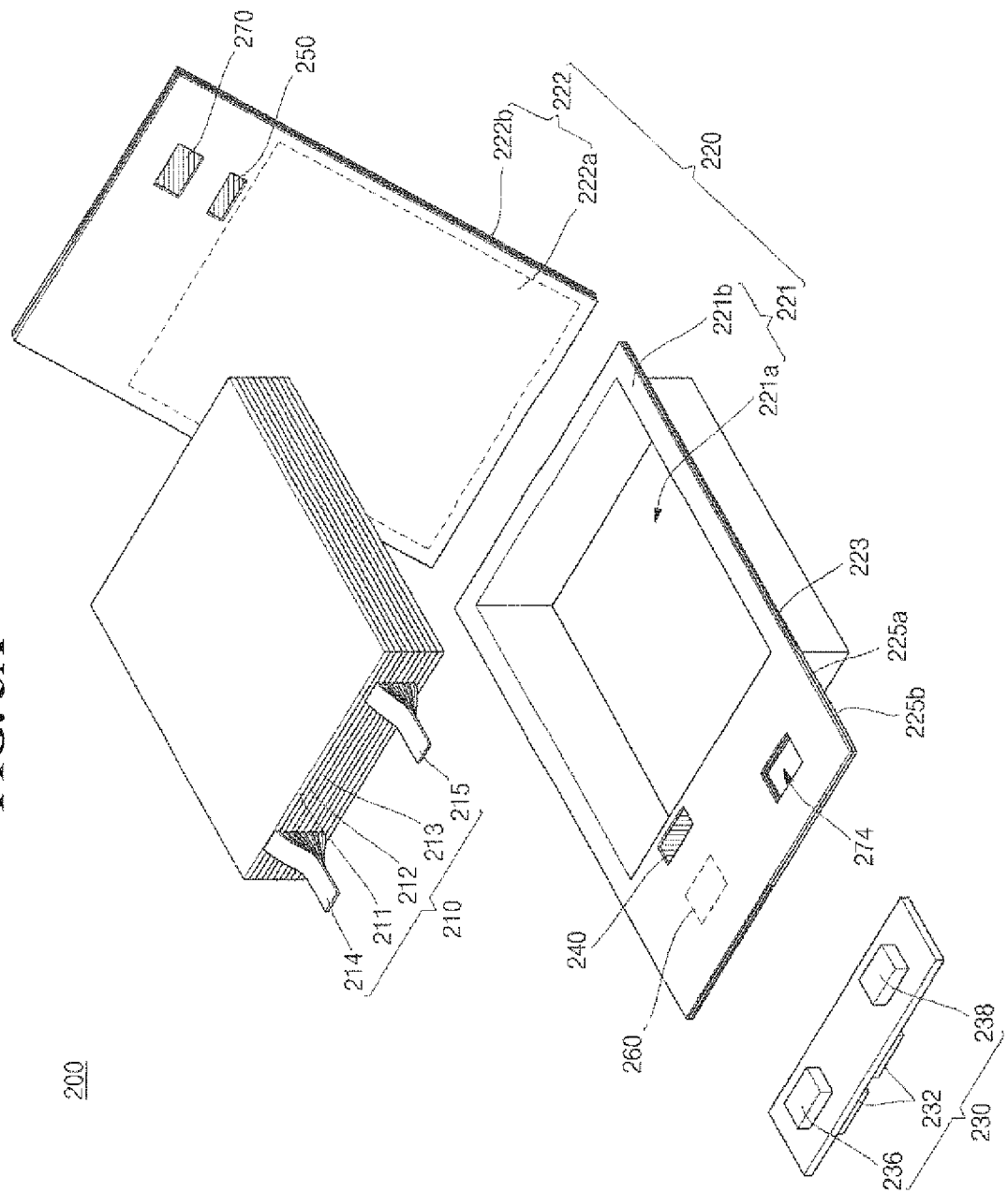
FIG. 5A is a perspective view of a secondary battery according to a second preferred embodiment of the present invention.
Figure 5B:
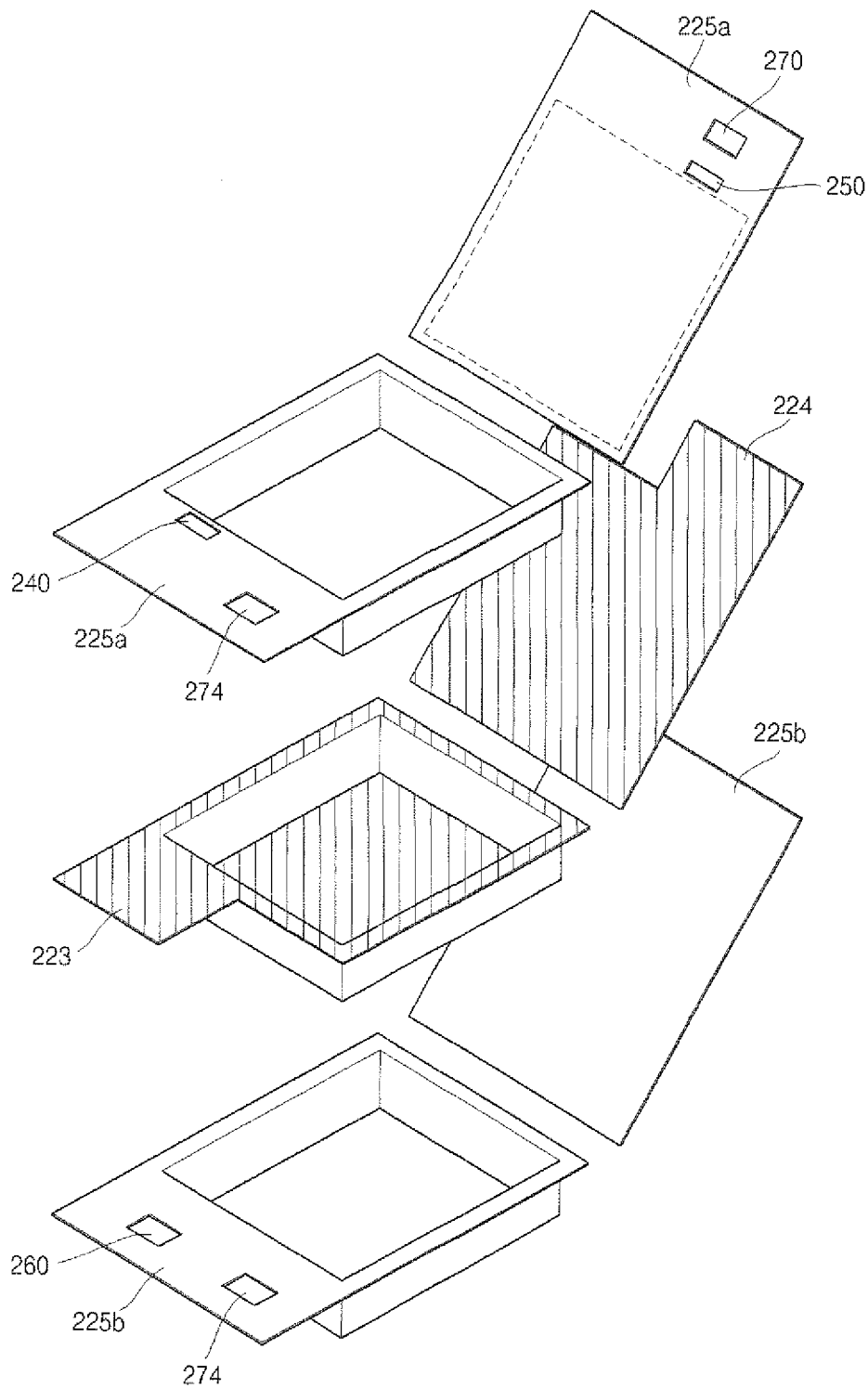
FIG. 5B is an exploded perspective view illustrating various layers of a pouch in the secondary battery illustrated in FIG. 5A.

FIG. 5A is a perspective view of a secondary battery according to a second preferred embodiment of the present invention, and FIG. 5B is an exploded perspective view illustrating various layers of a pouch in the secondary battery illustrated in FIG. 5A.

Referring to FIGS. 5A and 5B, the secondary battery 200 includes an electrode assembly 210 having a first electrode 211, a second electrode 212, a separator 213, a first electrode tab 214 and a second electrode tab 215.

The secondary battery 200 also includes a pouch 220 constructed by a body 221 and a cover 222, the body 221 having a receiving part 221a, and a body sealing part 221b, and including a first insulation layer 225a, a first conductive layer 223 and a second insulation layer 225b, the cover 222 having a covering part 222a and a cover sealing part 222b, and including a first insulation layer 225a, a second conductive layer 224 and a second insulation layer 225b.

The body 221 includes a first tab contact portion 240, a first external contact portion 260 and a via hole 274. The cover 222 includes a second tab contact portion 250 and a second external contact portion 270.

In addition, the secondary battery 200 includes a protective circuit module 230 including control devices 232, external terminals (not shown), a first contact terminal 236 and a second contact terminal 238.

In this case, various components of the secondary battery 200 according to the second embodiment of the present invention, including the electrode assembly 210, the pouch 220, and the protective circuit module 230, are substantially the same as the corresponding counterpart components of the secondary battery 100 according to the first embodiment, including the electrode assembly 110, the pouch 120, and the protective circuit module 130, as illustrated in FIGS. 1, 2, 3A, 3B and 4A thru 4C. In detail, the electrode assembly 210 of the secondary battery 200 according to the second embodiment of the present invention, including the first electrode 211, the second electrode 212, the separator 213, the first electrode tab 214 and the second electrode tab 215, corresponds to the electrode assembly 110 of the secondary battery 100 according to the first embodiment of the present invention, including the first electrode 111, the second electrode 112, the separator 113, the first electrode tab 114 and the second electrode tab 115. The pouch 220 of the secondary battery 200 according to the second embodiment of the present invention, including the body 221 and the cover 222, the body 221 including the receiving part 221a and the body sealing part 221b, the first insulation layer 225a, the first conductive layer 223, the second insulation layer 225b, the first tab contact portion 240, the first external contact portion 260 and the via hole 274, and the cover 222 including the covering part 222a, the cover sealing part 222b, the first insulation layer 225a, the second conductive layer 224, the second insulation layer 225b, the second tab contact portion 250 and the second external contact portion 270, corresponds to the pouch 120 of the secondary battery 100 according to the first embodiment of the present invention, including the body 121 and the cover 122, the body 121 including the receiving part 121a and the body sealing part 121b, the first insulation layer 125a, the first conductive layer 123, the second insulation layer 125b, the first tab contact portion 140, the first external contact portion 160 and the via hole 174, and the cover 122 including the covering part 122a, the cover sealing part 122b, the first insulation layer 125a, the second conductive layer 124, the second insulation layer 125b, the second tab contact portion 150 and the second external contact portion 170. The protective circuit module 230 of the secondary battery 200 according to the second embodiment of the present invention, including the control devices 232, the external terminals (not shown), the first contact terminal 236 and the second contact terminal 238, corresponds to the protective circuit module 130 of the secondary battery 100 according to the first embodiment of the present invention, including the control devices 132, the external terminals (not shown), the first contact terminal 136 and the second contact terminal 138.

In other words, the secondary battery 200 according to the second preferred embodiment of the present invention is different from the secondary battery 100 illustrated in FIGS. 1, 2, 3A, 3B and 4A thru 4C in view of the first and second conductive layers 223 and 224 and the via hole 274 corresponding to the first and second conductive layers 123 and 124 and the via hole 174, respectively. Accordingly, in the following description, only different components between the two exemplary embodiments, that is, the first and second conductive layers 223 and 224 and the via hole 274, will be explained.

Referring to FIGS. 5A and 5B, the first conductive layer 223 is provided in the receiving part 221a and the body sealing part 221b extending from the receiving part 221a.

In this case, the first conductive layer 223 is not formed all over the body sealing part 221b. That is to say, the first conductive layer 223 is not formed on a predetermined region of the body sealing part 221b.

The second conductive layer 224 is provided in the covering part 222a and the cover sealing part 222b extending from the covering part 222a.

Like the first conductive layer 223, the second conductive layer 225 is not formed on a predetermined region of the cover sealing part 222b.

The first conductive layer 223 and the second conductive layer 224 are provided such that a predetermined area of the body sealing part 221b without the first conductive layer 223 overlaps in a planar manner the predetermined area of the cover sealing part without the second conductive layer 224.

This is because the via hole 274 is formed at a predetermined position of the body sealing part 221b corresponding to the second external contact portion 270 exposing the second conductive layer 224 due to a contact between the second conductive layer 224 exposed by the second external contact portion 270 formed at the cover sealing part 222b and the second contact terminal 238 of the protective circuit module 230.

If the first conductive layer 223 is formed at a predetermined position of the body sealing part 221b having the via hole 274, the via hole 274 passes through only the first insulation layer 225a and the second insulation layer 225b so that a portion, that is, a lateral surface, of the first conductive layer 223, is not exposed. Accordingly, when the second contact terminal 238 of the protective circuit module 230 comes into contact with the second conductive layer 224 through the via hole 274, the first conductive layer 223 is not exposed through the via hole 274 at all, thereby preventing the first conductive layer 223 and the second conductive layer 224 from being short-circuited.

Figure 6B:
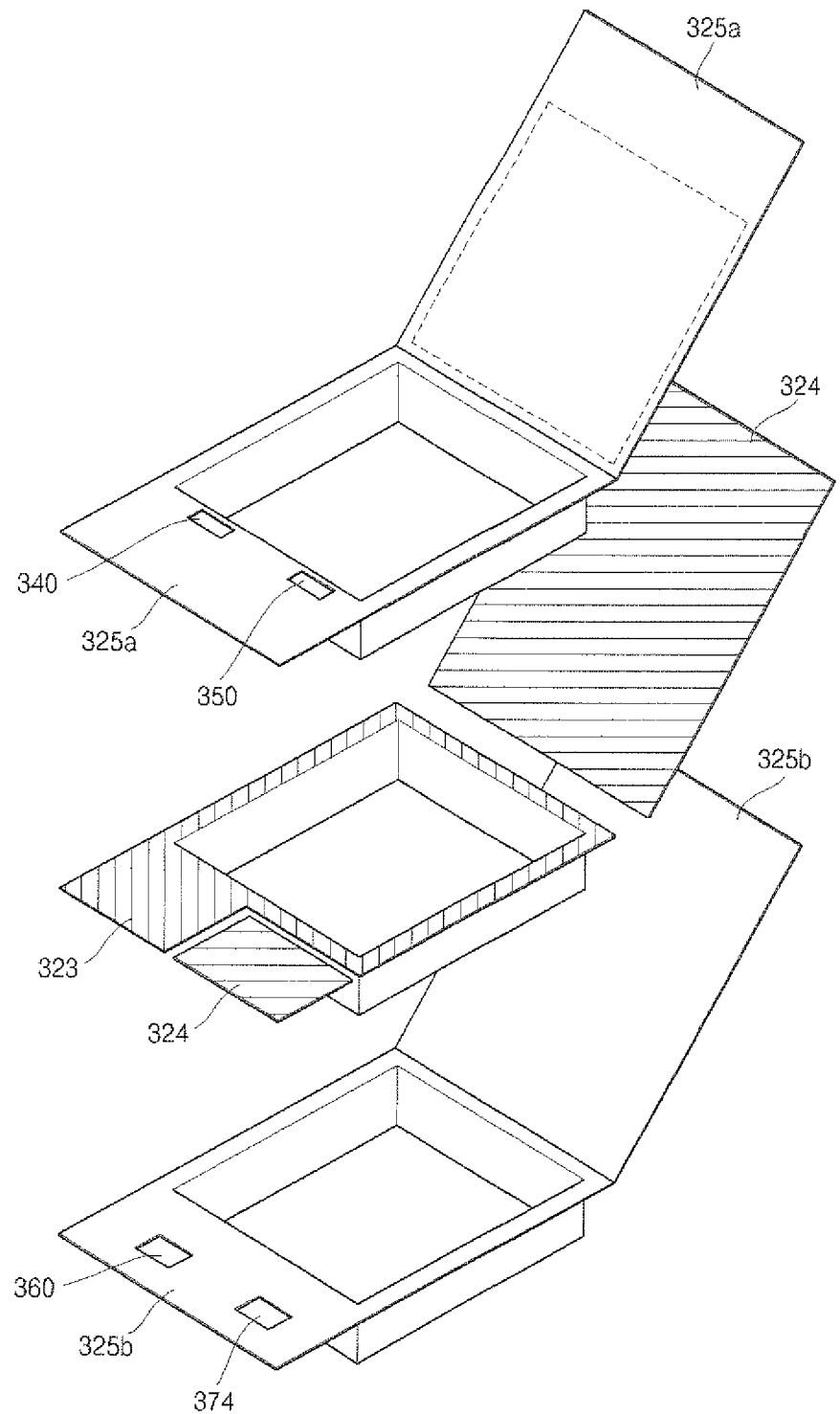
FIG. 6B is an exploded perspective view illustrating various layers of a pouch in the secondary battery illustrated in FIG. 6A.

FIG. 6A is a perspective view of a secondary battery according to a third preferred embodiment of the present invention, and FIG. 6B is an exploded perspective view illustrating various layers of a pouch in the secondary battery illustrated in FIG. 6A.

Referring to FIGS. 6A and 6B, the secondary battery 300 according to the third preferred embodiment of the present invention includes an electrode assembly 310 having a first electrode 311, a second electrode 312, a separator 313, a first electrode tab 314 and a second electrode tab 315.

The secondary battery 300 also includes a pouch 320 constructed by a body 321 and a cover 322, the body 321 having a receiving part 321a, a body sealing part 321b, and including a first insulation layer 325a, a first conductive layer 323 and a second conductive layer 324, and the cover 322 having a covering part 322a and a cover sealing part 322b, and including a first insulation layer 325a and a second insulation layer 325b.

The body 321 includes a first tab contact portion 340, a first external contact portion 360, a second tab contact portion 350 and a second external contact portion 370.

In addition, the secondary battery 300 includes a protective circuit module 330 including control devices 332, external terminals (not shown), a first contact terminal 336 and a second contact terminal 338.

In this case, various components of the secondary battery 300 according to the third embodiment of the present invention, including the electrode assembly 310, the pouch 320, and the protective circuit module 330, are substantially the same as the corresponding counterpart components of the secondary battery 100 according to the first embodiment, including the electrode assembly 110, the pouch 120, and the protective circuit module 130, as illustrated in FIGS. 1, 2, 3A, 3B and 4A thru 4C. In detail, the electrode assembly 310 of the secondary battery 300 according to the third embodiment of the present invention, including the first electrode 311, the second electrode 312, the separator 313, the first electrode tab 314 and the second electrode tab 315, corresponds to the electrode assembly 110 of the secondary battery 100 according to the first embodiment of the present invention, including the first electrode 111, the second electrode 112, the separator 113, the first electrode tab 114 and the second electrode tab 115. The pouch 320 of the secondary battery 300 according to the third embodiment of the present invention, including the body 321 and the cover 322, the body 321 including the receiving part 321a and the body sealing part 321b, the first insulation layer 325a, the first conductive layer 323, the second conductive layer 324, the second insulation layer 325b, the first tab contact portion 340, the first external contact portion 360, the second tab contact portion 350 and the second external contact portion 370, and the cover 322 including the covering part 322a, and the cover sealing part 322b, corresponds to the pouch 120 of the secondary battery 100 according to the first embodiment of the present invention, including the body 121 and the cover 122, the body 121 including the receiving part 121a and the body sealing part 121b, the first insulation layer 125a, the first conductive layer 123, the second insulation layer 125b, the first tab contact portion 140, the first external contact portion 160 and the via hole 174, and the cover 122 including the covering part 122a, the cover sealing part 122b, the first insulation layer 125a, the second conductive layer 124, the second insulation layer 125b, the second tab contact portion 150 and the second external contact portion 170. The protective circuit module 330 of the secondary battery 300 according to the third embodiment of the present invention, including the control devices 332, the external terminals (not shown), the first contact terminal 336 and the second contact terminal 338, corresponds to the protective circuit module 130 of the secondary battery 100 according to the first embodiment of the present invention, including the control devices 132, the external terminals (not shown), the first contact terminal 136 and the second contact terminal 138.

In other words, the secondary battery 300 according to the third preferred embodiment of the present invention is different from the secondary battery 100 illustrated in FIGS. 1, 2, 3A, 3B and 4A thru 4C in view of the first and second conductive layers 323 and 324, respectively, and the second tab contact portion 350 and the second external contact portion 370 corresponding to the first and second conductive layers 123 and 124, respectively, the second tab contact portion 150 and the second external contact portion 170, respectively. Accordingly, in the following description, only different components between the two exemplary embodiments, that is, the first and second conductive layers 323 and 324, respectively, and the via hole 374, will be explained.

In other words, the secondary battery 300 according to the third preferred embodiment of the present invention is different from the secondary battery 100 illustrated in FIGS. 1, 2, 3A, 3B and 4A thru 4C in that the first and second tab contact portions 340 and 350, respectively, and the first and second external contact portions 360 and 370, respectively, are provided at surfaces of opposing sides of the body sealing part 321b, respectively. Therefore, although the cover 322 includes the second conductive layer 324, as shown in FIGS. 6A and 6B, the second conductive layer 324 provided at the cover 322 is not electrically connected to the first electrode tab 314 or the second electrode tab 315.

The first conductive layer 323 is provided at the receiving part 321a and extends from the receiving part 321a to be provided at the body sealing part 321b, while the first conductive layer 323 is not provided at a predetermined region of the body sealing part 321b.

The predetermined region of the body sealing part 321b without the first conductive layer 323 is provided with the second conductive layer 324, as shown in FIGS. 6A and 6B.

The first tab contact portion 340 is provided at the body sealing part 321b and opens a portion of the first insulation layer 325a of the body sealing part 321b so as to thereby expose the first conductive layer 323 provided at the body 320.

The second tab contact portion 350 is provided at the body sealing part 321b and opens a portion of the first insulation layer 325a of the body sealing part 321b so as to thereby expose the second conductive layer 324 provided at the body 320.

The second external contact portion 370 opens a portion of the second insulation layer 325b of the body sealing part 321b so as to thereby expose the second conductive layer 324 provided at the body 320.

In this case, since the first external contact portion 360 and the second external contact portion 370 open the second insulation layer 325b of the body sealing part 321b so as to expose the first conductive layer 323 and the second conductive layer 324, respectively, depths of the first external contact portion 360 and the second external contact portion 370 may be equal to each other. Accordingly, the first contact terminal 336 and the second contact terminal 338 of the protective circuit module 300 may have the same height as each other.

The first tab contact portion 340 and the second tab contact portion 350 are provided at one surface of the body sealing part 321b, and the first external contact portion 360 and the second external contact portion 370 are provided at the other surface of the body sealing part 321b. Therefore, the first tab contact portion 340 and the second tab contact portion 350 are easily brought into contact with the first electrode tab 314 and the second electrode tab 315 of the electrode assembly 300. Likewise, the first external contact portion 360 and the second external contact portion 370 are easily brought into contact with the first contact terminal 336 and the second contact terminal 338, respectively, of the protective circuit module 300.

Figure 7A:
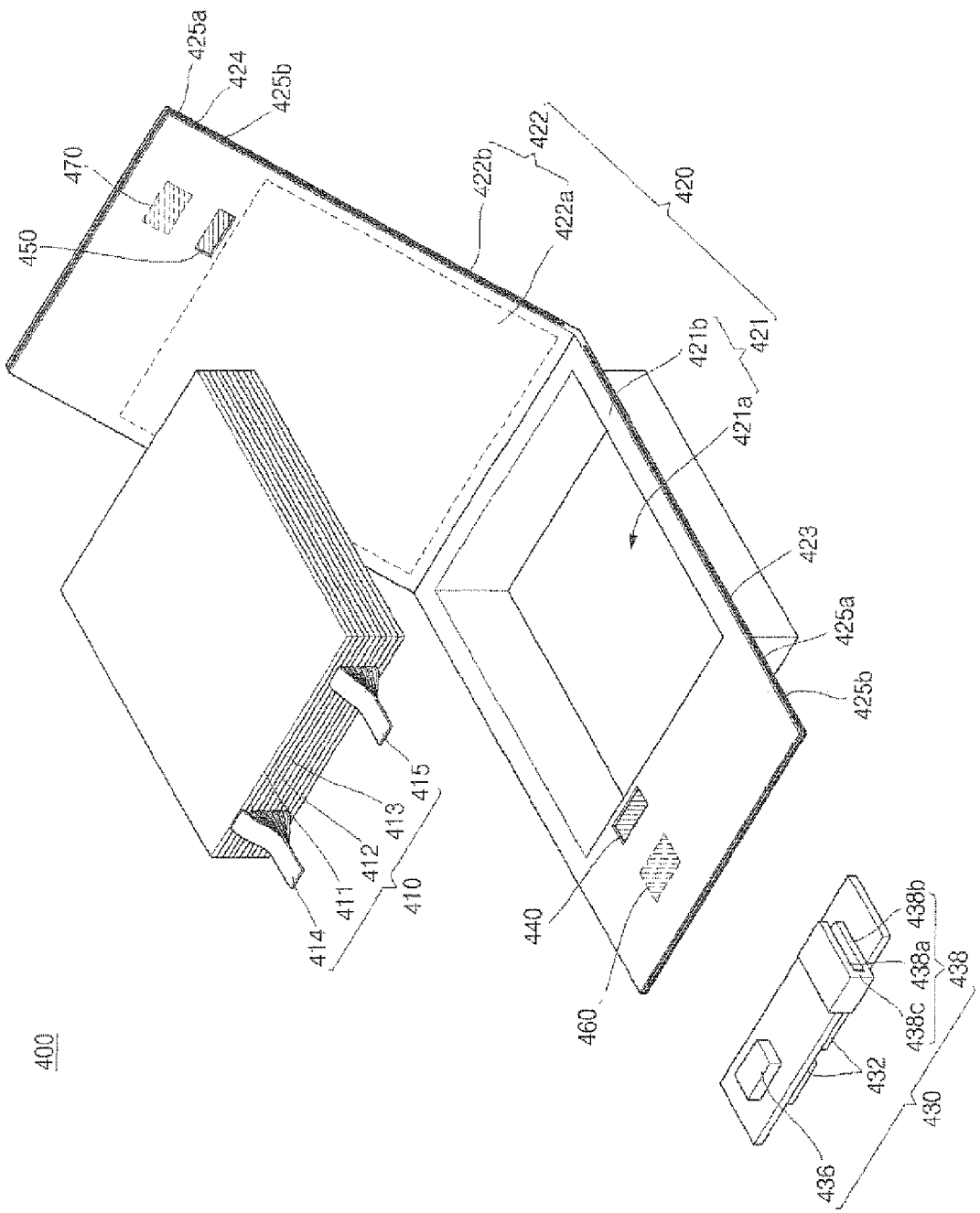
FIG. 7A is a perspective view of a secondary battery according to a fourth preferred embodiment of the present invention.
Figure 7B:
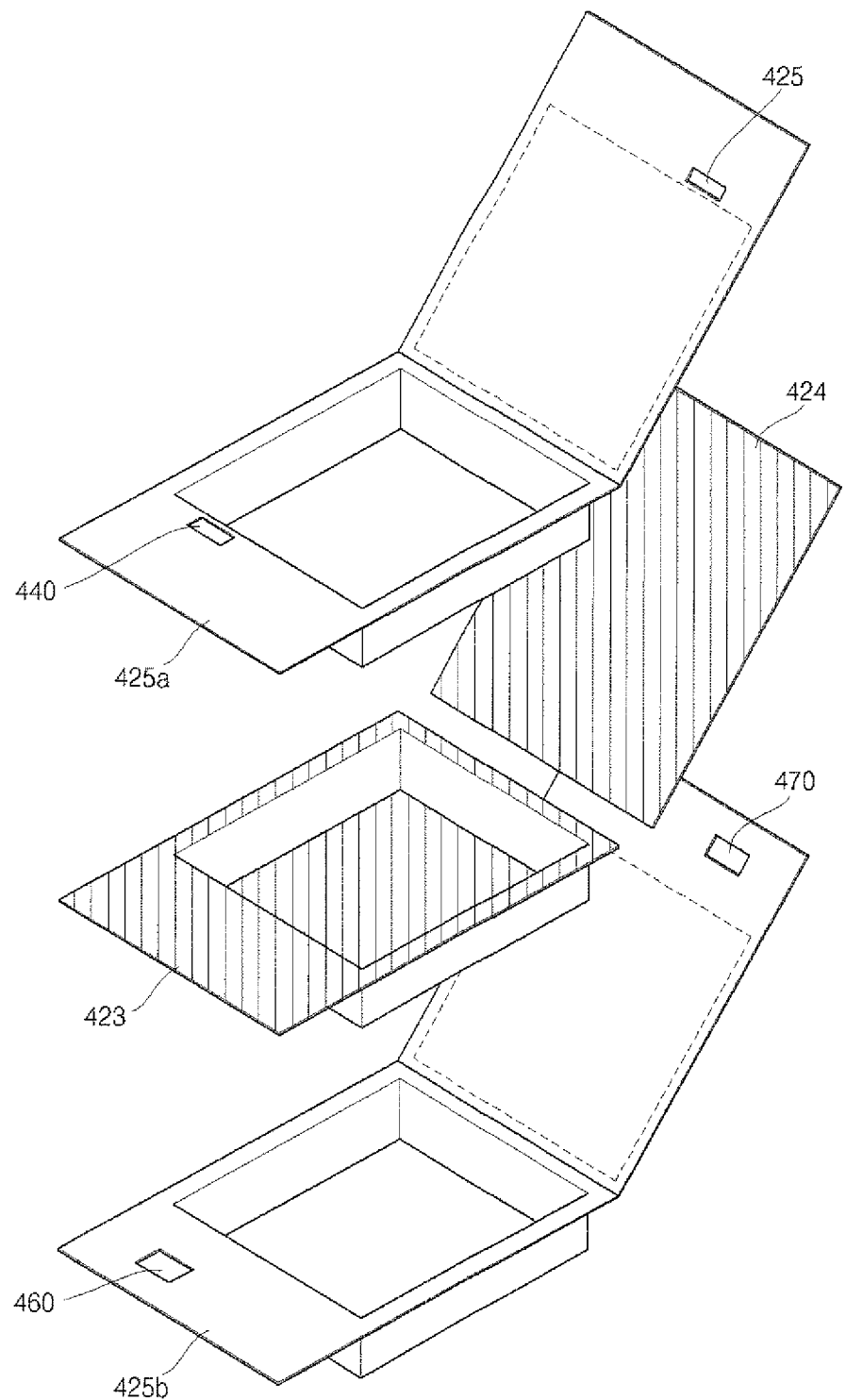
FIG. 7B is an exploded perspective view illustrating various layers of a pouch in the secondary battery illustrated in FIG. 7A.

FIG. 7A is a perspective view of a secondary battery according to a fourth preferred embodiment of the present invention, and FIG. 7B is an exploded perspective view illustrating various layers of a pouch in the secondary battery illustrated in FIG. 7A.

Referring to FIGS. 7A and 7B, the secondary battery 400 according to the fourth preferred embodiment of the present invention includes an electrode assembly 410 having a first electrode 411, a second electrode 412, a separator 413, a first electrode tab 414 and a second electrode tab 415.

The secondary battery 400 also includes a pouch 420 constructed by a body 421 and a cover 422, the body 421 having a receiving part 421a and a body sealing part 421b, and including a first insulation layer 425a, a first conductive layer 423 and a second insulation layer 425b, and the cover having a covering part 422a and a cover sealing part 422b, and including a first insulation layer 425a, a second conductive layer 424 and a second insulation layer 425b.

The body 421 includes a first tab contact portion 440 and a first external contact portion 460. The cover 422 includes a second tab contact portion 450 and a second external contact portion 470.

In addition, the secondary battery 400 includes a protective circuit module 430 including control devices 432, external terminals (not shown), a first contact terminal 436 and a second contact terminal 438.

In this case, various components of the secondary battery 400 according to the fourth embodiment of the present invention, including the electrode assembly 410, the pouch 420, and the protective circuit module 430, are substantially the same as the corresponding counterpart components of the secondary battery 100 according to the first embodiment, including the electrode assembly 110, the pouch 120, and the protective circuit module 130, as illustrated in FIGS. 1, 2, 3A, 3B and 4A thru 4C. In detail, the electrode assembly 410 of the secondary battery 400 according to the third embodiment of the present invention, including the first electrode 411, the second electrode 412, the separator 413, the first electrode tab 414 and the second electrode tab 415, corresponds to the electrode assembly 110 of the secondary battery 100 according to the first embodiment of the present invention, including the first electrode 111, the second electrode 112, the separator 113, the first electrode tab 114 and the second electrode tab 115. The pouch 420 of the secondary battery 400 according to the fourth embodiment of the present invention, including the body 421 and the cover 422, the body 421 including the receiving part 421a and the body sealing part 421b, the first insulation layer 425a, the first conductive layer 423, the second insulation layer 425b, the first tab contact portion 440, and the first external contact portion 460, and the cover 422 including the covering part 422a, the cover sealing part 422b, the first insulation layer 425a, the second conductive layer 424, the second insulation layer 425b, the second tab contact portion 450 and the second external contact portion 470, corresponds to the pouch 120 of the secondary battery 100 according to the first embodiment of the present invention, including the body 121 and the cover 122, the body 121 including the receiving part 121a and the body sealing part 121b, the first insulation layer 125a, the first conductive layer 123, the second insulation layer 125b, the first tab contact portion 140, the first external contact portion 160 and the via hole 174, and the cover 122 including the covering part 122a, the cover sealing part 122b, the first insulation layer 125a, the second conductive layer 124, the second insulation layer 125b, the second tab contact portion 150, and the second external contact portion 170. The protective circuit module 430 of the secondary battery 400 according to the fourth embodiment of the present invention, including the control devices 432, the external terminals (not shown), the first contact terminal 436 and the second contact terminal 438, corresponds to the protective circuit module 130 of the secondary battery 100 according to the first embodiment of the present invention, including the control devices 132, the external terminals (not shown), the first contact terminal 136 and the second contact terminal 138.

In other words, in the secondary battery 400 according to the fourth preferred embodiment of the present invention, a counterpart component corresponding to the via hole 174 is not provided. In addition, the secondary battery 400 according to the fourth preferred embodiment of the present invention is different from the secondary battery 100 illustrated in FIGS. 1, 2, 3A, 3B and 4A thru 4C in view of the second contact terminal 438 and the second external contact portion 470 corresponding to the corresponding components 138 and 170, respectively, of the secondary battery 100. Accordingly, in the following description, only different components between the two exemplary embodiments, that is, the second contact terminal 438 and the second external contact portion 470, will be explained.

The second external contact portion 470 is provided at the other surface of the cover sealing part 422b, thereby exposing the second conductive layer 424 at the other surface of the cover sealing part 422b.

In this case, the protective circuit module 400 is provided at the other surface of the body sealing part 421b.

In order to be electrically connected to the second conductive layer 424 exposed by the second external contact portion 470, the protective circuit module 400 includes the second contact terminal 438.

Since the protective circuit module 400 is provided at the other surface of the body sealing part 421b and the second conductive layer 424 exposed by the second external contact portion 470 is provided at the other surface of the cover sealing part 424b, the second contact terminal 438 includes a first terminal 438a connected to the second conductive layer 424, a second terminal 438b connected to the protective circuit module 400, and a third terminal 438c connecting the first terminal 438a and the second terminal 438b.

In this case, since the second contact terminal 438 is in the form of a clip, and a lateral surface of the body sealing part 412b is inserted between the first terminal 438a and the second terminal 438b, the protective circuit module 400 is easily fixed to the pouch 420.

Figure 8:
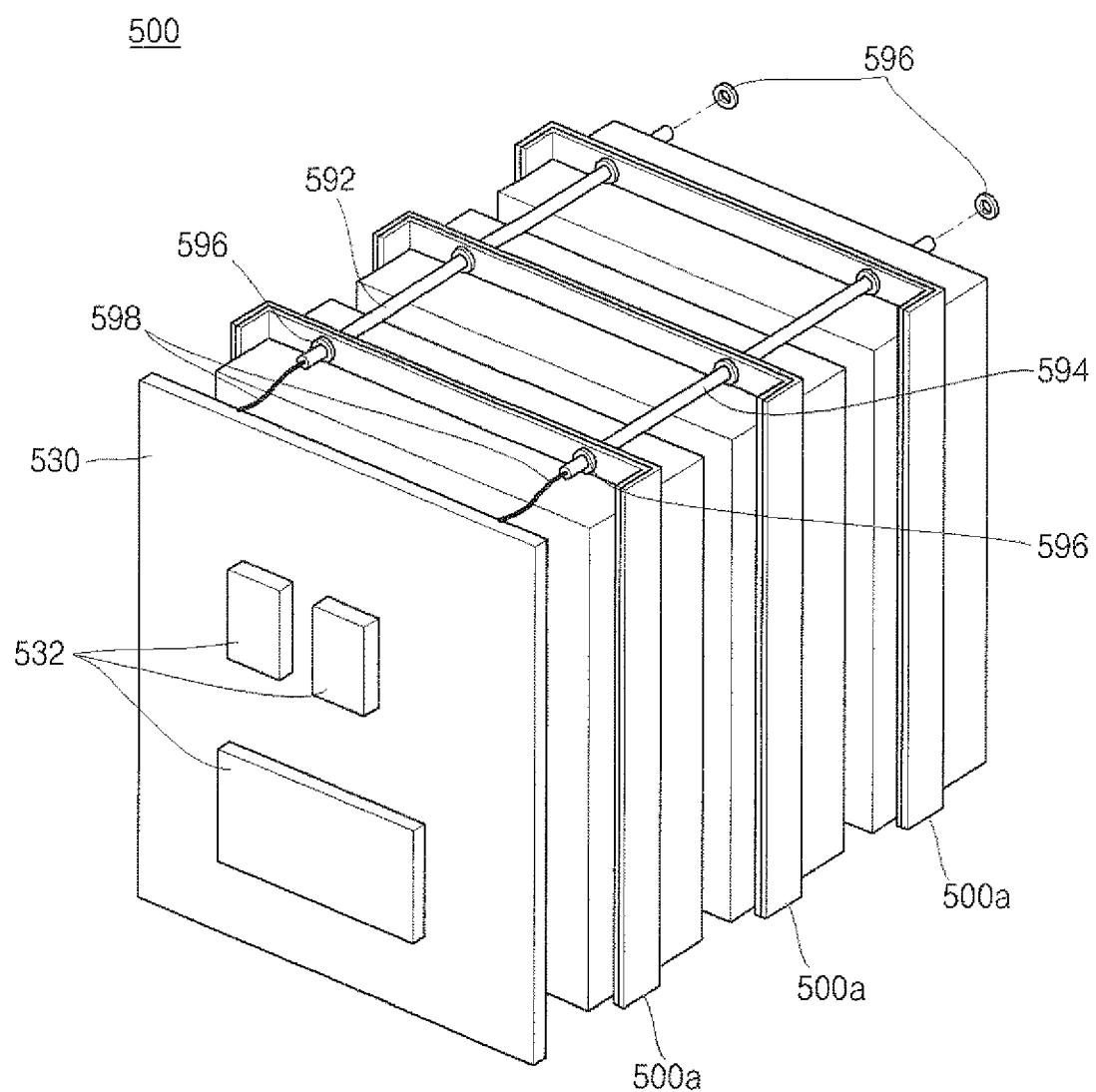
FIG. 8 is a perspective view of a secondary battery according to a fifth preferred embodiment of the present invention.
Figure 9A:
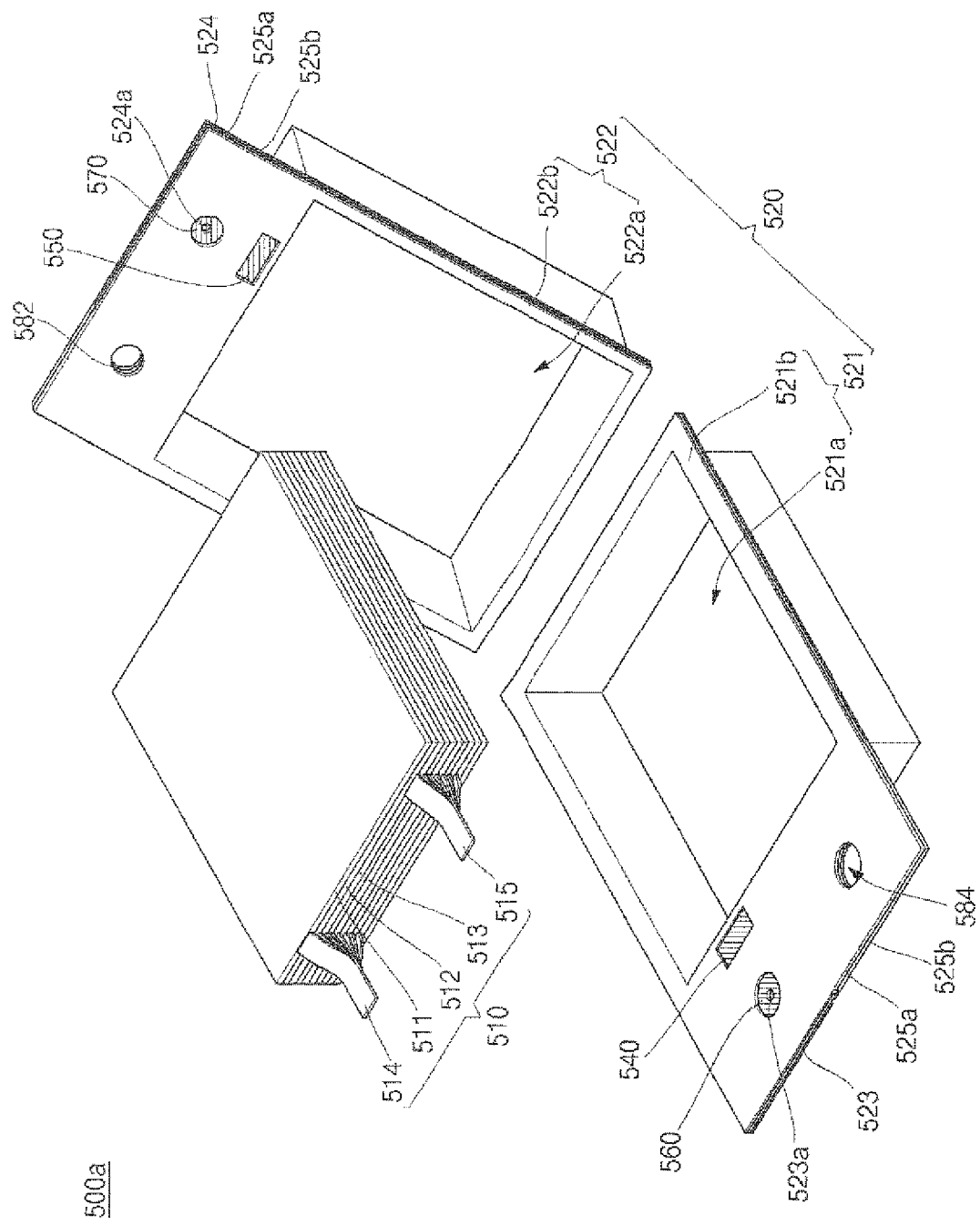
FIG. 9A is a perspective view illustrating a unit battery cell of the secondary battery illustrated in FIG. 8.
Figure 9B:
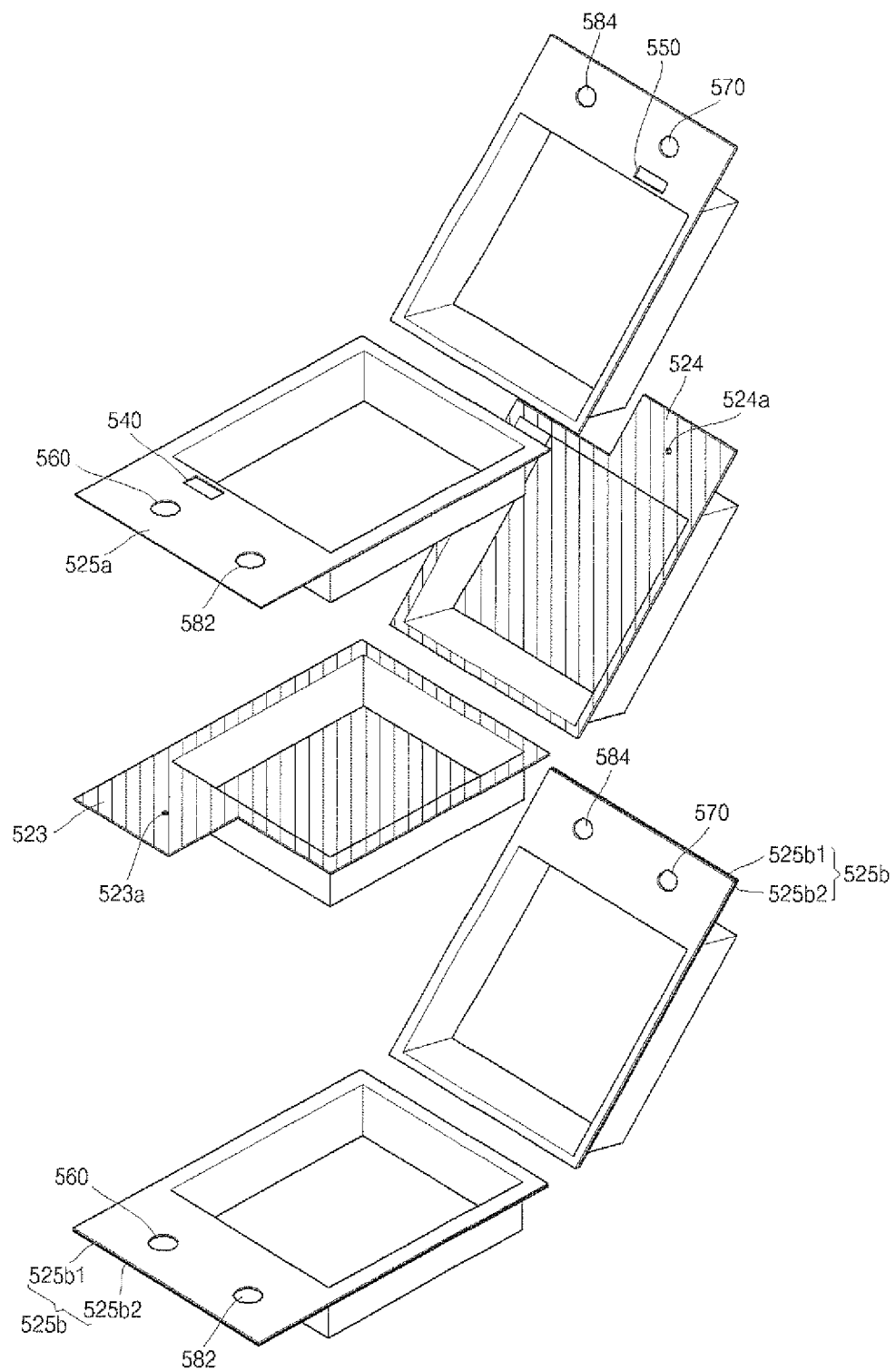
FIG. 9B is an exploded perspective view illustrating various layers of a pouch in the unit battery cell illustrated in FIG. 9A.

FIG. 8 is a perspective view of a secondary battery according to a fifth preferred embodiment of the present invention, FIG. 9A is a perspective view illustrating a unit battery cell of the secondary battery illustrated in FIG. 8, and FIG. 9B is an exploded perspective view illustrating various layers of a pouch in the unit battery cell illustrated in FIG. 9A.

Referring to FIGS. 8, 9A and 9B, the secondary battery 500 according to the fifth preferred embodiment of the present invention is middle-sized and large-sized having a plurality of unit cells 500a connected to each other.

Each of the plurality of unit battery cells 500a includes an electrode assembly 510 having a first electrode 511, a second electrode 512, a separator 513, a first electrode tab 514 and a second electrode tab 515.

In addition, each of the plurality of unit battery cells 500a includes a pouch 520.

The pouch 520 includes a lower body 521 having a first receiving part 521a and a lower body sealing part 521b, and an upper body 522 having a second receiving part 522a and an upper body sealing part 522b.

The secondary battery 500 includes the protective circuit module 530 connected to the plurality of unit battery cells 500a and including control devices 532.

The electrode assembly 510, including the first electrode 511, the second electrode 512, separator 513, the first electrode tab 514 and the second electrode tab 515, which are substantially the same as the corresponding counterpart components of the electrode assembly 110 of the secondary battery 100 described with reference to FIGS. 1, 2, 3A, 3B and 4A thru 4C, including the first electrode 111, the second electrode 112, the separator 113, the first electrode tab 114 and the second electrode tab 115, and thus a detailed explanation thereof will not be given.

The lower body 521 includes the first insulation layer 525a, the first conductive layer 523 and the second insulation layer 525b, and the upper body 522 includes the first insulation layer 525a, the second conductive layer 524 and the second insulation layer 525b. In this case, the second insulation layer 525b may comprise two layers 525b1 and 525b2. Therefore, the first insulation layer 525a and the second insulation layer 525b may be formed of a CPP layer, a nylon layer and a PET layer.

The lower body 521 includes the first receiving part 521a and the lower body sealing part 521b extending from the first receiving part 521a, and the upper body 522 having the second receiving part 522a and the upper body sealing part 522b.

The lower body 521 includes a first tab contact portion 540 exposing the first conductive layer 523, and the upper body 522 includes a second tab contact portion 550 exposing the second conductive layer 524.

The lower body 521 includes a first external contact portion 560 exposing the first conductive layer 523 formed at opposing surfaces of the lower body sealing part 521b, that is, at one surface and the other surface opposed to the one surface of the lower body sealing part 521b. That is to say, the first external contact portion 560 is provided at the first and second insulation layers 525a and 525b of the lower body sealing part 521b of the lower body 521.

The upper body 522 includes a second external contact portion 570 exposing the second conductive layer 524 formed at opposing surfaces of the upper body sealing part 522b, that is, at one surface and the other surface opposed to the one surface of the upper body sealing part 522b. That is to say, the second external contact portion 570 is provided at the first and second insulation layers 525a and 525b, respectively, of the upper body sealing part 522b of the upper body 522.

In addition, the lower body 521 includes a via hole 584 corresponding to the second external contact portion 570 and passing through the first insulation layer 525a and the second insulation layer 525b of the lower body 521. Thus, even when the lower body sealing part 521b and the upper body sealing part 522b are sealed to each other, the second conductive layer 524 exposed by the second external contact portion 570 may be exposed at the other surface of the lower body 521.

The upper body 522 includes a via hole 584 corresponding to the first external contact portion 560 and passing through the first insulation layer 525a and the second insulation layer 525b of the upper body 522. Thus, even when the lower body sealing part 521b and the upper body sealing part 522b are sealed to each other, the first conductive layer 523 exposed by the first external contact portion 560 may be exposed at the other surface of the upper body 522.

In addition, a first conductive layer via hole 523a passing through the first conductive layer 523 is formed at a predetermined position of the first conductive layer 523 exposed by the first external contact portion 560. A second conductive layer via hole 524a passing through the second conductive layer 524 is formed at a predetermined position of the second conductive layer 524 exposed by the second external contact portion 570.

Meanwhile, the secondary battery 500 may include the protective circuit module 530 having the plurality of unit battery cells 500a connected to a first connection member 592 and a second connection member 594.

The protective circuit module 530 includes the control devices 532 including IC devices for controlling the secondary battery 500.

The first connection member 592 passes through the first conductive layer via holes 523a of the plurality of unit cells 500a so as to thereby fasten the plurality of unit cells 500a and electrically connect with one another.

In addition, the first connection member 592 tightly engages the first connection member 592 with the first conductive layer 523 of each of the plurality of unit cells 500a using fastening members 596 like bolts and nuts. In this case, if the fastening members 596 are made of a conductive material, an electrical connection between the first connection member 592 and the first conductive layer 523 can be more securely achieved by means of the fastening members 596.

The second connection member 594 passes through the second conductive layer via holes 524a of the plurality of unit cells 500a so as to thereby fasten the plurality of unit cells 500a and electrically connect with one another.

In addition, the second connection member 594 tightly engages the second connection member 594 with the second conductive layer 524 of each of the plurality of unit cells 500a using fastening members 596 like bolts and nuts. Here, if the fastening members 596 are made of a conductive material, an electrical connection between the second connection member 594 and the second conductive layer 524 can be more securely achieved by means of the fastening members 596.

Meanwhile, electrical connections between each of the first connection member 592, the second connection member 594 and the protective circuit module 530 may be established using conducting wires 598. Alternatively, electrical connections between each of the first connection member 592, the second connection member 594 and the protective circuit module 530 may also be established such that the first and second connection members 592 and 594, respectively, directly contact the protective circuit module 530.

The components of the secondary battery 500, which are not described in detail in the present embodiment, are substantially the same as the corresponding counterpart components of the secondary battery 100 illustrated in FIGS. 1, 2, 3A, 3B and 4A thru 4C, and thus repeated explanations thereof will not be given.

Figure 10:
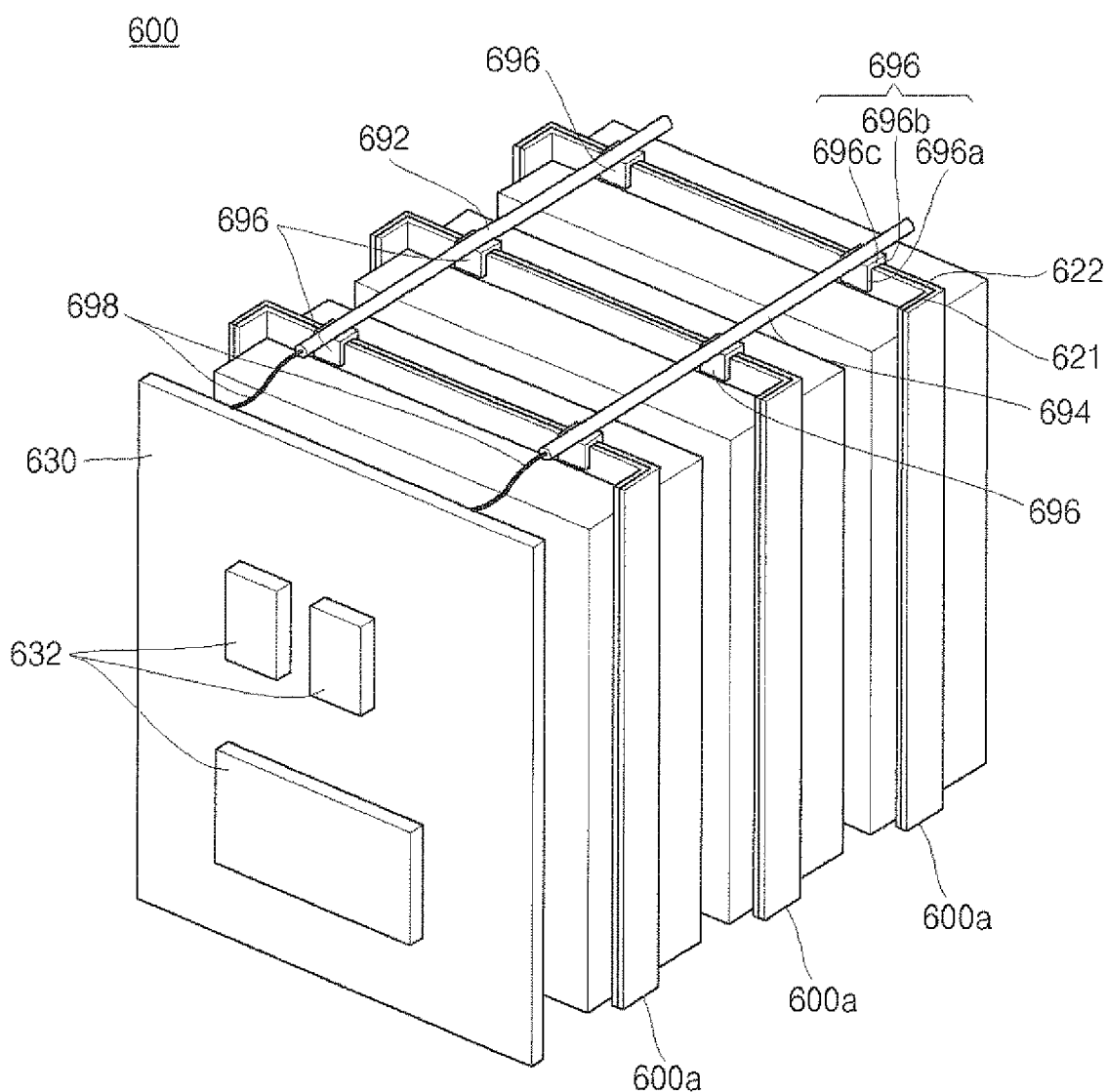
FIG. 10 is a perspective view of a secondary battery according to a sixth preferred embodiment of the present invention.
Figure 11A:
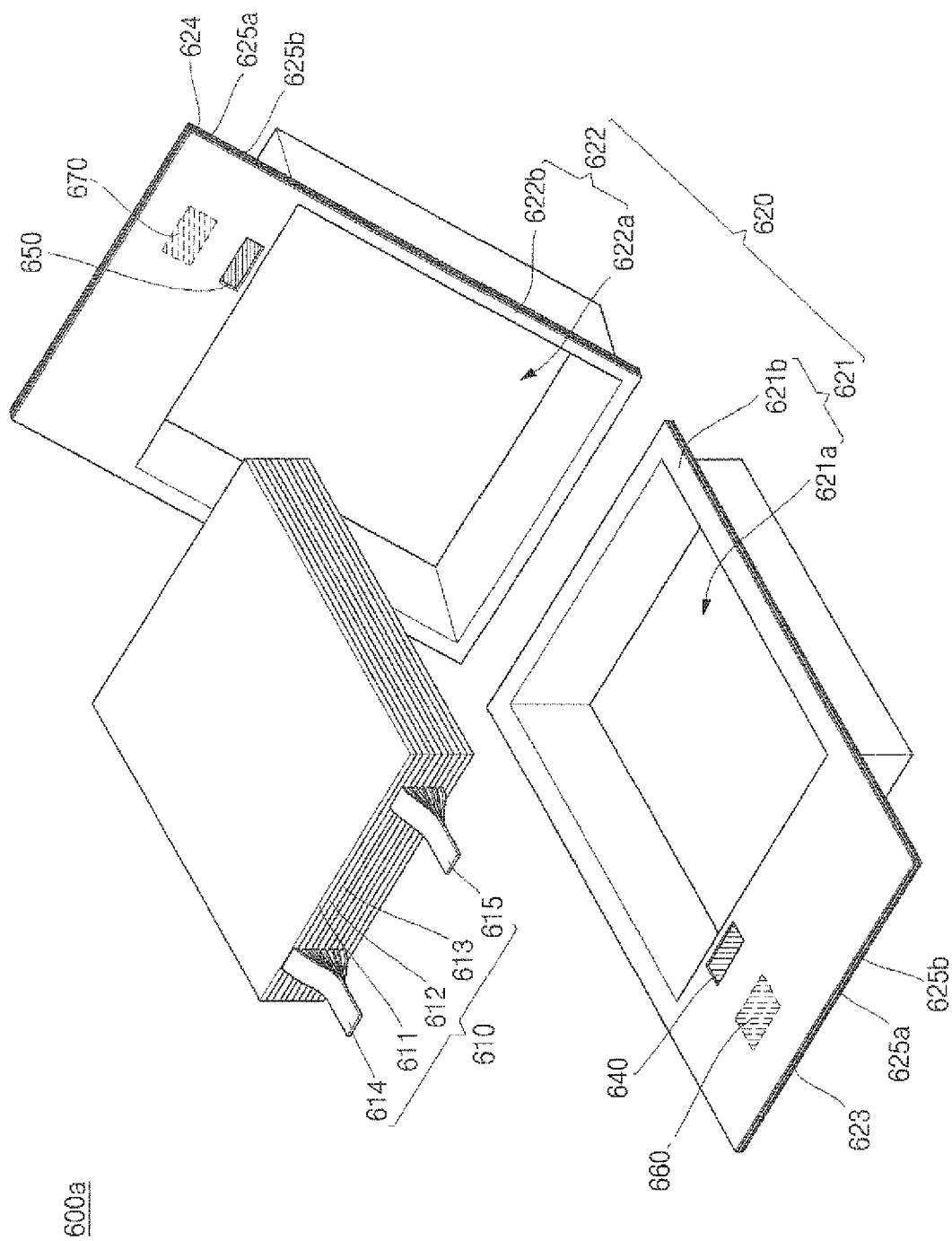
FIG. 11A is a perspective view illustrating a unit battery cell of the secondary battery illustrated in FIG. 10.
Figure 11B:
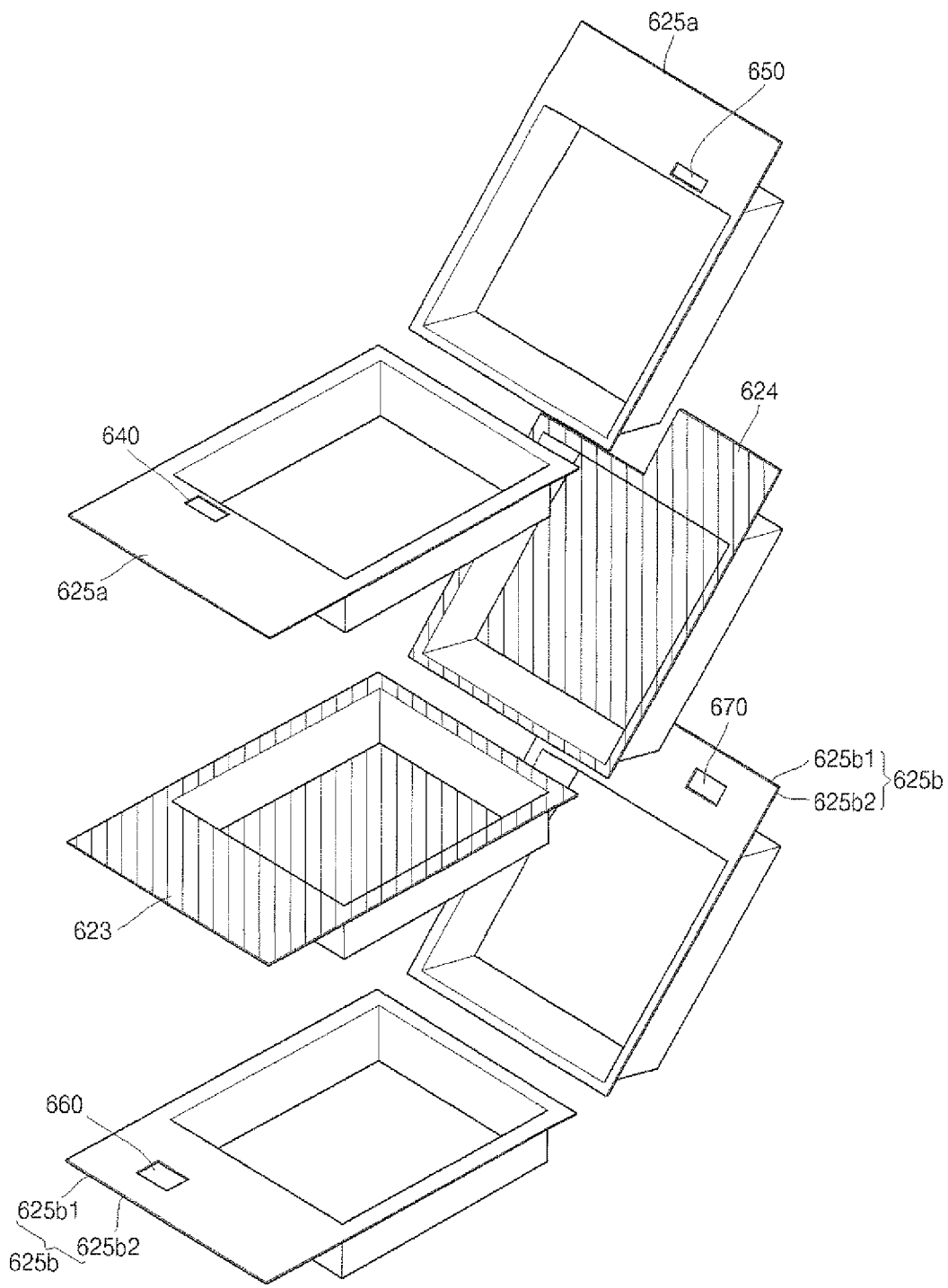
FIG. 11B is an exploded perspective view illustrating various layers of a pouch in the unit battery cell illustrated in FIG. 11A.

FIG. 10 is a perspective view of a secondary battery according to a sixth preferred embodiment of the present invention, FIG. 11A is a perspective view illustrating a unit battery cell of the secondary battery illustrated in FIG. 10, and FIG. 11B is an exploded perspective view illustrating various layers of a pouch in the unit battery cell illustrated in FIG. 11A.

Referring to FIGS. 10, 11A and 11B, the secondary battery 600 according to the sixth preferred embodiment of the present invention is a medium-sized secondary battery having a plurality of unit cells 600a connected therein.

Each of the plurality of unit battery cells 600a includes an electrode assembly 610 having a first electrode 611, a second electrode 612, a separator 613, a first electrode tab 614 and a second electrode tab 615.

In addition, each of the plurality of unit battery cells 600a includes a pouch 620.

The pouch 620 includes a lower body 621 having a first receiving part 621a and a lower body sealing part 621b, and an upper body 622 having a second receiving part 622a and an upper body sealing part 622b.

The secondary battery 600 includes a protective circuit module 630 connected to the plurality of unit battery cells 600a and including control devices 632.

The components of the electrode assembly 610, including the first electrode 611, the second electrode 612, the separator 613, the first electrode tab 614 and the second electrode tab 615, are substantially the same as the corresponding counterpart components of the electrode assembly 110 of the secondary battery 100 illustrated in FIGS. 1, 2, 3A, 3B and 4A thru 4C, including the first electrode 111, the second electrode 112, the separator 113, the first electrode tab 114 and the second electrode tab 115, and thus repeated explanations thereof will not be given.

The pouch 620 includes a lower body 621 having a first receiving part 621a and a lower body sealing part 621b, and an upper body 622 having a second receiving part 622a and an upper body sealing part 622b.

The lower body 621 includes the first insulation layer 625a, the first conductive layer 623 and the second insulation layer 625b, and the upper body 622 includes the first insulation layer 625a, the second conductive layer 624 and the second insulation layer 625b. In this case, the second insulation layer 625b may comprise two layers 625b1 and 625b2. Therefore, the first insulation layer 625a and the second insulation layer 625b may be formed of a CPP layer, a nylon layer and a PET layer.

The lower body 621 includes the first receiving part 621a and the lower body sealing part 621b extending from the first receiving part 621a, and the upper body 622 includes the second receiving part 622a and the upper body sealing part 622b.

The lower body 621 includes a first tab contact portion 640 exposing the first conductive layer 623, and the upper body 622 includes a second tab contact portion 650 exposing the second conductive layer 624.

The lower body 6521 includes a first external contact portion 660 exposing the first conductive layer 623 formed at the other surface of the lower body 621.

The upper body 622 includes a second external contact portion 670 exposing the second conductive layer 624 formed at the other surface of the upper body 622.

Meanwhile, the secondary battery 600 includes the protective circuit module 630 having the plurality of unit battery cells 600a connected to a first connection member 692 and a second connection member 694.

The protective circuit module 630 includes the control devices 632 including IC devices for controlling the secondary battery 600.

The first connection member 692 and the second connection member 694 are connected to clip-type connecting parts 696, which are electrically connected to the plurality of unit cells 600a, respectively.

Each of the clip-type connecting parts 696 includes a first terminal 696a, a second terminal 696b and a third terminal 696c.

Each of the clip-type connecting parts 696 is provided in the form of a clip bent between the first terminal 696a and the second terminal 696b, and between the second terminal 696b and the third terminal 696c, so as to be combined with both the lower body 621 and the upper body 622 at the same time, thereby establishing an electrical connection with the unit cells 600a.

The first terminal 696a and the second terminal 696b are electrically connected to the first conductive layer 623 exposed by the first external contact portion 660 and the second conductive layer 624 exposed by the second external contact portion 670, respectively.

The third terminal 696c is electrically connected to the first connection member 692 or the second connection member 694.

The first terminal 696a and the second terminal 696b may be electrically connected to the first conductive layer 623 and the second conductive layer 624 by, for example, welding.

Meanwhile, electrical connections between each of the first connection member 692, the second connection member 694 and the protective circuit module 630 may be established using conducting wires 698. Alternatively, electrical connections between each of the first connection member 692, the second connection member 694 and the protective circuit module 630 may also be established such that the first and second connection members 692 and 694, respectively, directly contact the protective circuit module 630.

The components of the secondary battery 600 which have not been described in detail in the present embodiment are substantially the same as the corresponding counterpart components of the secondary battery 100 illustrated in FIGS. 1, 2, 3A, 3B and 4A thru 4C, and thus repeated explanations thereof will not be given.

Exemplary embodiments have been disclosed herein, and although specific terms are employed, they are used and are to be interpreted in a generic and descriptive sense only, and not for purpose of limitation. Accordingly, it will be understood by those of ordinary skill in the art that various changes in form and detail may be made without departing from the spirit and scope of the present invention as set forth in the following claims.

What is claimed is:

1. A secondary battery, comprising:
    an electrode assembly including a first electrode, a second electrode, a separator interposed between the first electrode and the second electrode for insulating the first electrode and the second electrode from each other, a first electrode tab extending from one side of the first electrode, and a second electrode tab extending from one side of the second electrode; and
    a pouch including a body and a cover,
    wherein the body of the pouch includes a receiving part for accommodating the electrode assembly, and a body sealing part extending from the receiving part,
    wherein the cover of the pouch includes a covering part corresponding to the receiving part of the body, and a cover sealing part corresponding to the body sealing part,
    wherein the body comprises at least two insulation layers and a conductive layer interposed between said at least two insulation layers and the cover comprises at least two insulation layers and a conductive layer interposed between said at least two insulation layers,
    wherein the first electrode tab and the second electrode tab are electrically connected to the conductive layers of the body and the cover, respectively, of the pouch,
    wherein the conductive layer of the body is electrically insulated from the conductive layer of the cover, and
    wherein the body includes a first tab contact portion exposing the first conductive layer formed at one surface of the body and a first external contact portion exposing the first conductive layer at another surface of the body.

2. The secondary battery of claim 1, wherein the first electrode tab and the second electrode tab extending from the first electrode and the second electrode, respectively, do not extend outside the pouch.

3. The secondary battery as claimed in claim 1, wherein the conductive layers are made of one of aluminum (Al) and copper (Cu).

4. The secondary battery as claimed in claim 1, wherein the conductive layer of the body includes first conductive layers formed at the receiving part and the body sealing part extending from the receiving part, and the conductive layer of the cover includes second conductive layers formed at the covering part and the cover sealing part extending from the covering part.

5. The secondary battery as claimed in claim 4,
    wherein the cover includes a second tab contact portion exposing the second conductive layer formed at one surface of the cover facing said one surface of the body;
    wherein the first electrode tab is electrically connected to the first conductive layer through the first tab contact portion; and
    wherein the second electrode tab is electrically connected to the second conductive layer through the second tab contact portion.

6. The secondary battery as claimed in claim 4, wherein the body sealing part includes a via hole passing through the body sealing part, and the cover sealing part includes a second external contact portion exposing the second conductive layer formed at a surface, the second external contact portion corresponding to the via hole, the second conductive layer exposed by the second external contact portion and the via hole.

7. The secondary battery as claimed in claim 6, further comprising a protective circuit module, wherein the protective circuit module is electrically connected to the first external contact portion and the second external contact portion.

8. The secondary battery as claimed in claim 7, wherein the protective circuit module is formed at another surface of the body sealing part.

9. A secondary battery, comprising:
    an electrode assembly including a first electrode, a second electrode, a separator interposed between the first electrode and the second electrode for insulating the first electrode and the second electrode from each other, a first electrode tab extending from one side of the first electrode, and a second electrode tab extending from one side of the second electrode; and
    a pouch including a body and a cover;
    wherein the body of the pouch includes a receiving part for accommodating the electrode assembly, and a body sealing part extending from the receiving part;
    wherein the cover of the pouch includes a covering part corresponding to the receiving part of the body, and a cover sealing part corresponding to the body sealing part;
    wherein at least two insulation layers and a conductive layer interposed between said at least two insulation layers are provided at the body and the cover, respectively, of the pouch;
    wherein the first electrode tab and the second electrode tab are electrically connected to the conductive layers of the body and the cover, respectively, of the pouch;
    wherein the conductive layer of the body includes first conductive layers formed at the receiving part and the body sealing part extending from the receiving part;
    wherein the conductive layer of the cover includes second conductive layers formed at the covering part and the cover sealing part extending from the covering part; and
    wherein the body sealing part has a predetermined area without the first conductive layer, and the cover sealing part has a predetermined area without the second conductive layer, the predetermined area of the body sealing part overlapping the predetermined area of the cover sealing part in a planar manner.

10. The secondary battery as claimed in claim 9,
    wherein the body includes a first tab contact portion exposing the first conductive layer formed at at least one of a surface of the receiving part and a surface of the body sealing part of the body;
    wherein the cover includes a second tab contact portion exposing the second conductive layer formed at at least one of a surface of the covering part and a surface of the cover sealing part of the cover facing said one surface of the body;
    wherein the first electrode tab is electrically connected to the first conductive layer through the first tab contact portion; and
    wherein the second electrode tab is electrically connected to the second conductive layer through the second tab contact portion.

11. The secondary battery as claimed in claim 10, wherein the body sealing part includes a first external contact portion exposing the first conductive layer at another surface of the body sealing part, the body sealing part includes a via hole passing through the body sealing part, and the cover sealing part includes a second external contact portion exposing the second conductive layer at a surface of the cover sealing part, the second external contact portion corresponding to the via hole.

12. The secondary battery as claimed in claim 11, further comprising a protective circuit module, wherein the protective circuit module is electrically connected to the first external contact portion and the second external contact portion.

13. The secondary battery as claimed in claim 12, wherein the protective circuit module includes a first contact terminal contacting the first external contact portion and a second contact terminal contacting the second external contact portion, the first contact terminal being formed so as to have a height corresponding to a depth of the first external contact portion, and the second contact terminal being formed so as to have a height corresponding to a depth of the via hole and the second external contact portion.

14. The secondary battery as claimed in claim 12, wherein the protective circuit module is provided at said another surface of the body sealing part.

15. The secondary battery as claimed in claim 1,
wherein the conductive layer of the body includes first conductive layers formed at the receiving part and the body sealing part extending from the receiving part;
wherein the conductive layer of the cover includes second conductive layers formed at the covering part and the cover sealing part;
wherein the cover includes a second tab contact portion exposing the second conductive layer formed at one surface of the cover facing said one surface of the body and a second external contact portion exposing the second conductive layer at another surface of the cover;
wherein the first electrode tab is electrically connected to the first conductive layer through the first tab contact portion; and
wherein the second electrode tab is electrically connected to the second conductive layer through the second tab contact portion.

16. The secondary battery as claimed in claim 15, further comprising a protective circuit module, wherein the protective circuit module is electrically connected to the first external contact portion and the second external contact portion.

17. The secondary battery as claimed in claim 16,
wherein the protective circuit module includes a first contact terminal contacting the first external contact portion and a second contact terminal contacting the second external contact portion, and
wherein the second contact terminal is bent at least twice, one side end thereof being connected to the protective circuit module and another side end thereof being connected to the second external contact portion.

18. The secondary battery as claimed in claim 16, wherein the protective circuit module is provided at a surface of the body sealing part.

19. The secondary battery as claimed in claim 1, wherein said insulation layers are made of one of cast polypropylene (CPP), nylon and PET.

20. A secondary battery, comprising:
an electrode assembly including a first electrode, a second electrode, a separator interposed between the first electrode and the second electrode for insulating the first electrode and the second electrode from each other, a first electrode tab extending from one side of the first electrode, and a second electrode tab extending from one side of the second electrode; and
a pouch including a body and a cover;
wherein the body of the pouch includes a receiving part for accommodating the electrode assembly, and a body sealing part extending from the receiving part;
wherein the cover of the pouch includes a covering part corresponding to the receiving part of the body, and a cover sealing part corresponding to the body sealing part;
wherein at least two insulation layers and a conductive layer interposed between said at least two insulation layers are provided at the body and the cover, respectively, of the pouch;
wherein the first electrode tab and the second electrode tab are electrically connected to the conductive layers of the body and the cover, respectively, of the pouch;
wherein the conductive layer of the body includes first conductive layers formed at the receiving part and the body sealing part extending from the receiving part, and
wherein the conductive layer of the cover includes second conductive layers electrically insulated from the first conductive layers and formed at a region other than a predetermined area of the cover sealing part.

21. The secondary battery as claimed in claim 20,
wherein the body sealing part includes a first tab contact portion exposing the first conductive layer and a second tab contact portion exposing the second conductive layer, the first and second tab contact portions being formed at one surface of the body sealing part;
wherein the first electrode tab is electrically connected to the first conductive layer through the first tab contact portion; and
wherein the second electrode tab is electrically connected to the second conductive layer through the second tab contact portion.

22. The secondary battery as claimed in claim 20, wherein the body sealing part includes a first external contact portion exposing the first conductive layer and a second external contact portion exposing the second conductive layer, the first and second external contact portions being formed at another surface of the body sealing part.

23. The secondary battery as claimed in claim 22, further comprising a protective circuit module, wherein the protective circuit module is electrically connected to the first external contact portion and the second external contact portion.

24. The secondary battery as claimed in claim 23,
wherein the protective circuit module includes a first contact terminal contacting the first external contact portion and a second contact terminal contacting the second external contact portion, and
wherein the first contact terminal is formed so as to have a height corresponding to a depth of the first external contact portion, and the second contact terminal is formed so as to have a height corresponding to a depth of the second external contact portion.

25. The secondary battery as claimed in claim 23, wherein the protective circuit module is provided at said another surface of the body sealing part.

26. A secondary battery, comprising:
a plurality of unit cells; and
a protective circuit module electrically connected to the plurality of unit cells;
wherein each of the plurality of unit cells comprises:
an electrode assembly including a first electrode, a second electrode, a separator interposed between the first electrode and the second electrode for insulating the first electrode and the second electrode from each other, a first electrode tab extending from one side of the first electrode, and a second electrode tab extending from one side of the second electrode; and a pouch including a body and a cover;

wherein the body of the pouch includes a first receiving part for accommodating the electrode assembly and a body sealing part extending from the first receiving part;

wherein the cover of the pouch includes a second receiving part corresponding to the first receiving part of the body and a cover sealing part extending from the second receiving part and corresponding to the body sealing part;

wherein each of the body and the cover of the pouch includes at least two insulation layers and a conductive layer interposed between said at least two insulation layers, respectively, and the first electrode tab and the second electrode tab are electrically connected to the conductive layers of the body and the cover, respectively;

wherein the conductive layer of the body includes first conductive layers formed at the first receiving part and the body sealing part extending from the first receiving part;

wherein the conductive layer of the cover includes second conductive layers formed at the second receiving part and the cover sealing part extending from the second receiving part;

wherein the body sealing part has a predetermined area without the first conductive layer, and the cover sealing part has a predetermined area without the second conductive layer, the predetermined area of the body sealing part overlapping the predetermined area of the cover sealing part in a planar manner;

wherein the body sealing part includes first external contact portions exposing the first conductive layers to surfaces of the body and a first conductive layer via hole through which predetermined areas of the first conductive layers exposed by the first external contact portion are passed; and wherein the cover sealing part includes second external contact portions exposing the second conductive layers to surfaces of the body and a second conductive layer via hole through which predetermined areas of the second conductive layers exposed by the second external contact portion are passed.

27. The secondary battery as claimed in claim 26, further comprising:

a first connection member electrically connecting the first conductive layers of the plurality of unit cells;

a second connection member electrically connecting the second conductive layers of the plurality of unit cells; and a plurality of fastening members fastening one of the first connection member and the second connection member with the plurality of unit cells, respectively, wherein the first connection member and the second connection member are electrically connected to the protective circuit module.

28. The secondary battery as claimed in claim 27, wherein an electrical connection of the first conductive layers and the second conductive layers to the protective circuit module is established using the first connection member and the second connection member, respectively, electrically connected to the first conductive layers and the second conductive layers, respectively, exposed by the first external contact portions provided at respective unit cells.

29. The secondary battery as claimed in claim 28, wherein electrical connections between the first connection member and each of the first conductive layers and electrical connections between the second connection member and each of the second conductive layers are established using clip-type connecting parts, respectively; and wherein each of the clip-type connecting parts has a first terminal, a second terminal and a third terminal, and is formed in the shape of a clip bent between the first terminal and the second terminal and between the second terminal and the third terminal, so as to connect the body and the cover at once and so as to be combined with each of the plurality of unit cells.

30. The secondary battery as claimed in claim 26, wherein the insulation layers comprise four insulation layers made of one of cast polypropylene (CPP), nylon and PET, and wherein the conductive layer is disposed between a CPP layer and a nylon layer.

* * * * *